(12) United States Patent
Keragala

(10) Patent No.: US 9,078,515 B2
(45) Date of Patent: Jul. 14, 2015

(54) MODULAR INTERIOR DESIGN SYSTEM

(76) Inventor: Rukshan Keragala, Staten Island, NY (US)

( * ) Notice: Subject to any disclaimer, the term of this patent is extended or adjusted under 35 U.S.C. 154(b) by 0 days.

(21) Appl. No.: 13/053,853

(22) Filed: Mar. 22, 2011

(65) Prior Publication Data

US 2012/0242200 A1    Sep. 27, 2012

(51) Int. Cl.

| | |
|---|---|
| F16B 12/00 | (2006.01) |
| A47B 47/04 | (2006.01) |
| A47B 87/02 | (2006.01) |
| A47B 87/00 | (2006.01) |
| A47C 13/00 | (2006.01) |
| F16B 12/14 | (2006.01) |
| F16B 12/42 | (2006.01) |

(52) U.S. Cl.
CPC .............. *A47B 47/042* (2013.01); *A47B 87/008* (2013.01); *A47B 87/02* (2013.01); *A47C 13/00* (2013.01); *A47C 13/005* (2013.01); *F16B 12/14* (2013.01); *F16B 12/42* (2013.01); *A47B 87/0276* (2013.01); *Y10T 29/49826* (2015.01)

(58) Field of Classification Search
CPC .... A47B 13/00; A47B 13/005; A47B 47/042; A47B 87/02; A47B 87/008; A47B 87/0276; F16B 12/14; F16B 12/42
USPC ................... 312/107, 108, 111, 257.1, 235.2, 312/235.4–235.7; 297/440.1, 440.14, 219.1
See application file for complete search history.

(56) References Cited

U.S. PATENT DOCUMENTS

| | | | |
|---|---|---|---|
| 2,582,553 A | | 8/1949 | McMurtrie |
| 3,234,896 A | * | 2/1966 | Bonsall ............ 108/60 |
| 3,583,780 A | * | 6/1971 | Berkowitz ............ 312/108 |
| 3,644,008 A | * | 2/1972 | Overby ............ 312/107 |
| 3,655,065 A | | 4/1972 | Yellin |
| 3,722,971 A | | 3/1973 | Zeischegg |
| 3,773,329 A | | 11/1973 | Secter |
| 3,811,728 A | * | 5/1974 | Redemske ............ 297/440.14 |
| 3,822,924 A | * | 7/1974 | Lust ............ 312/111 |
| 4,077,666 A | * | 3/1978 | Heumann ............ 297/440.14 |
| 4,108,514 A | * | 8/1978 | Zimmerman ............ 312/107 |

(Continued)

OTHER PUBLICATIONS

International Search Report and Written Opinion of the International Searching Authority; Application No. PCT/US2012/029877; Completed: Jun. 5, 2012; Mailed: Jun. 20, 2012; 9 pages.

(Continued)

*Primary Examiner* — Daniel J Troy
*Assistant Examiner* — Ryan A Doyle
(74) *Attorney, Agent, or Firm* — Levin Santalone LLP; John Santalone

(57) ABSTRACT

An interior design unit is provided including five planar members, each having a tetragon shape and removably attached to at least one other planar member, wherein each of planar members includes four through holes for receiving a connector for attachment to at least one other interior design unit, and wherein each through hole is positioned at substantially equal distance from an adjacent corner of the planar member. An interior design system is also provided including a plurality of modular units and at least one connector for removable attachment of one modular unit to one other modular unit, wherein each modular unit has a plurality of planar members removably connected to each other, wherein each of the planar members includes a plurality of through holes, and wherein the connector is received in any of the through holes in the planar members.

17 Claims, 41 Drawing Sheets

(56) References Cited

U.S. PATENT DOCUMENTS

| | | | | |
|---|---|---|---|---|
| 4,118,085 A | * | 10/1978 | Fibus | 312/245 |
| 4,130,971 A | * | 12/1978 | Herrig | 52/236.7 |
| 4,192,106 A | | 3/1980 | Hell | |
| 4,886,326 A | * | 12/1989 | Kuzyk | 312/257.1 |
| 4,903,451 A | * | 2/1990 | Gresswell | 52/584.1 |
| 4,932,720 A | | 6/1990 | Sherman | |
| 5,340,258 A | * | 8/1994 | Simon | 411/535 |
| 5,466,058 A | * | 11/1995 | Chan | 312/111 |
| 5,536,097 A | | 7/1996 | Hazan | |
| 5,810,505 A | * | 9/1998 | Henriott et al. | 403/230 |
| 6,063,007 A | | 5/2000 | Sithole | |
| 6,722,515 B2 | * | 4/2004 | Rumpel | 220/6 |
| 6,820,950 B1 | * | 11/2004 | Sun | 312/108 |
| RE38,836 E | * | 10/2005 | Krause et al. | 312/111 |
| 7,431,409 B2 | | 10/2008 | Yang | |
| 2002/0109442 A1 | * | 8/2002 | Hsu | 312/263 |
| 2002/0117944 A1 | * | 8/2002 | Chen | 312/249.11 |
| 2004/0222722 A1 | * | 11/2004 | Yang | 312/265.5 |
| 2005/0042027 A1 | * | 2/2005 | Migli | 403/409.1 |
| 2005/0200244 A1 | * | 9/2005 | Rouwhorst | 312/111 |
| 2006/0250052 A1 | * | 11/2006 | Davis et al. | 312/107 |
| 2007/0145865 A1 | | 6/2007 | Richter | |
| 2007/0257539 A1 | * | 11/2007 | White et al. | 297/440.14 |
| 2008/0074013 A1 | * | 3/2008 | Ahlgrim et al. | 312/108 |
| 2009/0315382 A1 | * | 12/2009 | Nelson | 297/440.1 |
| 2010/0019630 A1 | * | 1/2010 | Leng | 312/107 |
| 2010/0084356 A1 | * | 4/2010 | Wang | 211/186 |
| 2010/0237755 A1 | * | 9/2010 | Zalewski | 312/111 |
| 2012/0104824 A1 | * | 5/2012 | Skahan | 297/440.14 |
| 2012/0119629 A1 | * | 5/2012 | Nelson et al. | 312/111 |
| 2012/0229006 A1 | * | 9/2012 | Zalewski | 312/107 |

OTHER PUBLICATIONS

Design-Create-Live eBook by TETRAN Infinite Living Systems. Appendix—TETRAN Article links.

* cited by examiner

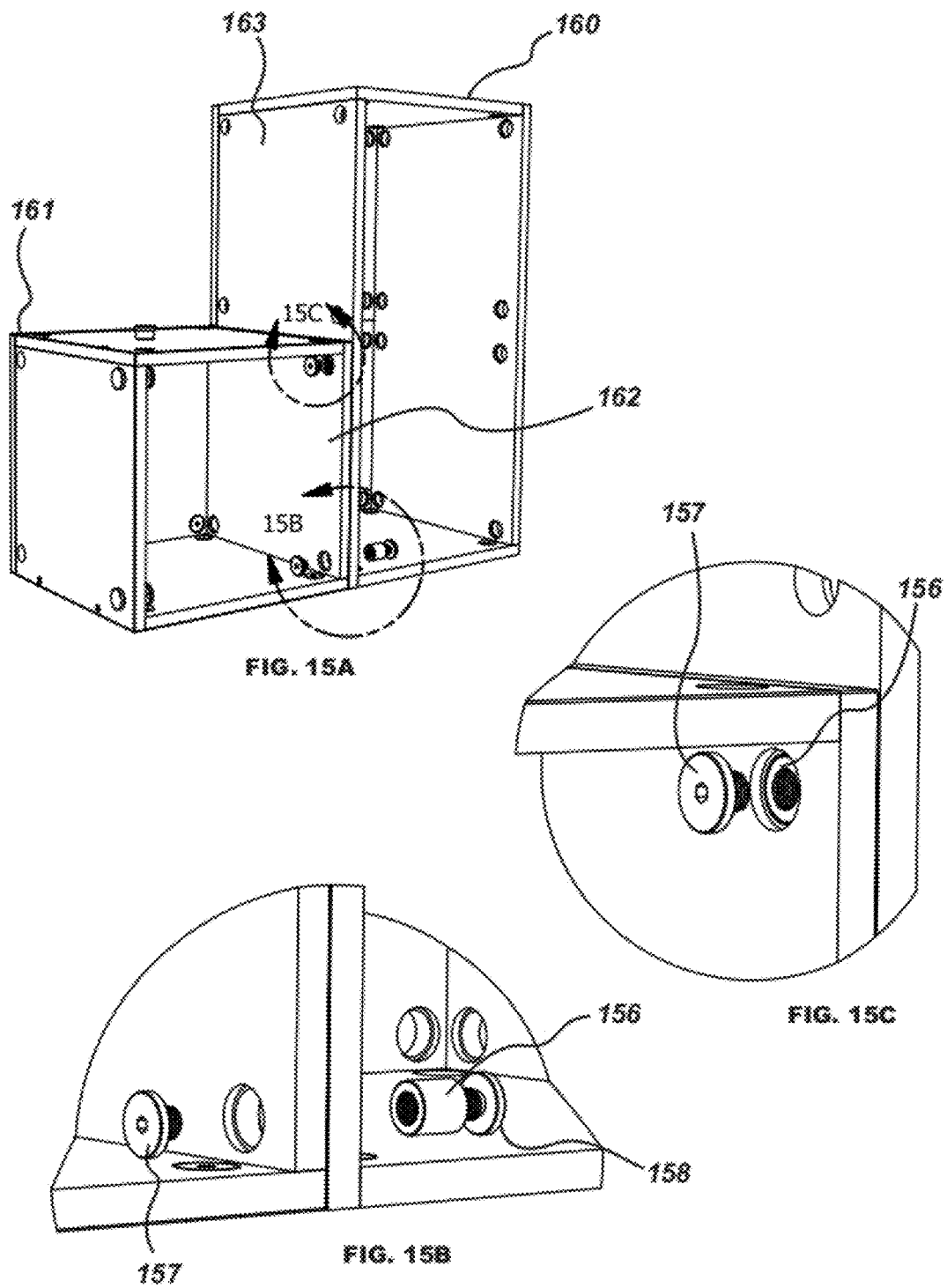

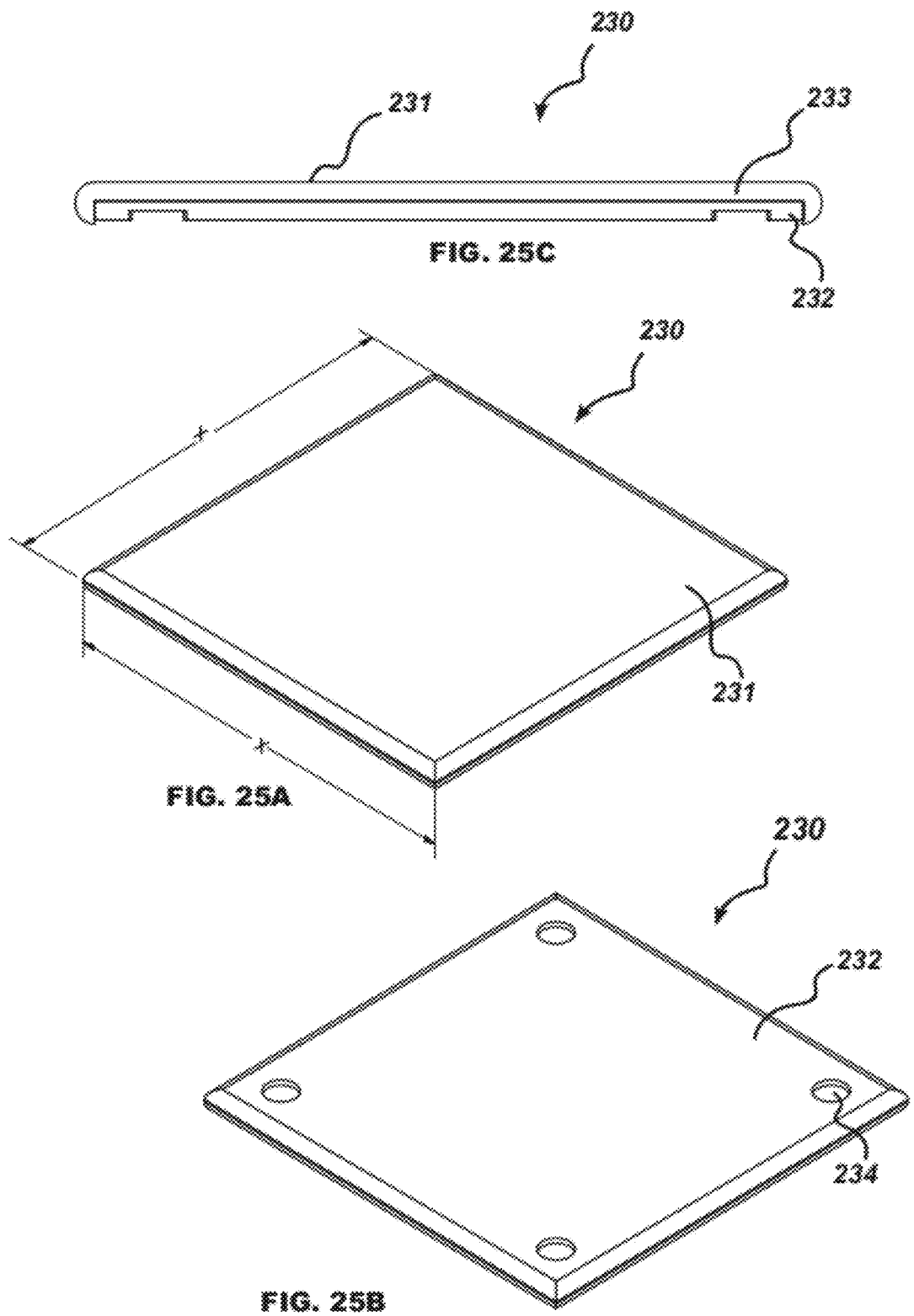

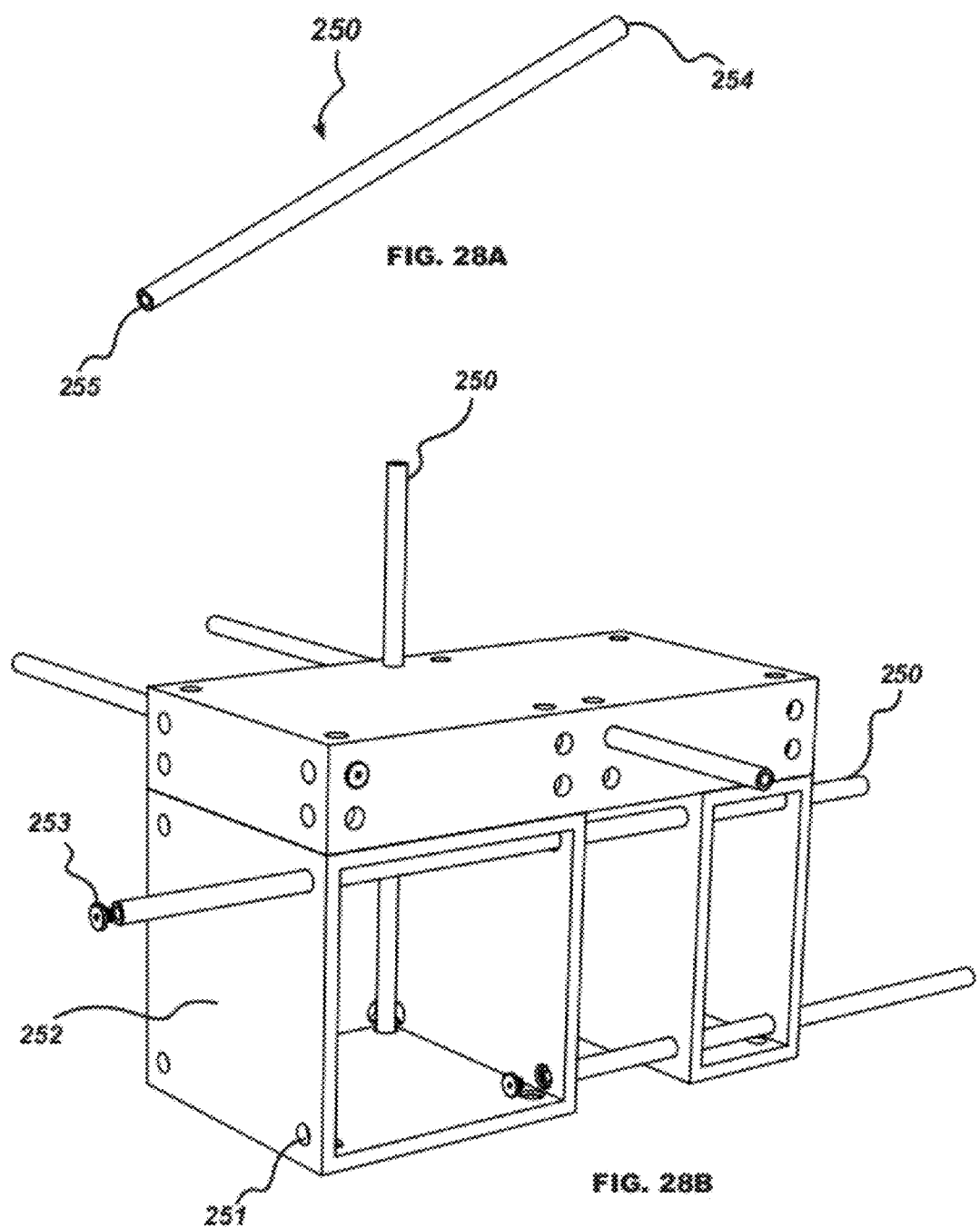

MODULAR INTERIOR DESIGN SYSTEM

FIELD OF THE INVENTION

The present invention relates generally to interior design and furniture. More specifically, the invention relates to a modular interior design system and a modular unit for use in the interior design system.

BACKGROUND OF THE INVENTION

The art of furniture design and construction has evolved rather rapidly over the last half century. A variety of shapes and sizes of furniture have been developed over the years to provide comfort and decoration. Traditional furniture has been used to furnish homes, offices and other commercial establishments for many years. Traditional furniture is typically made in a number of different styles, using a variety of materials and finished with a variety of surface finishes. One of common features of the traditional furniture, however, is that it comes completely assembled from the furniture manufacturer, and once the item of furniture has been made, it cannot be otherwise modified or tailored to suit the purchaser or the environment in which it is to be used.

A recent alternative furniture trend in our mobile, modern society has been to the modular furniture, wherein consumers purchase unfinished furniture kits that contain all necessary pieces to assemble a piece of furniture and then assemble the furniture themselves. Such modular furniture systems seems to suit the mobility factor of certain segments of our society due to the fact that such furniture can be easily disassembled for storage and/or compact moving and then readily reassembled in a new residence.

There are several known examples of the modular furniture systems. For example, U.S. Pat. No. 2,582,553 to McMurtrie discloses sectional toy furniture designed for children's amusement and intellectual development. The toy furniture consists of toy building blocks formed by panels that are fixed to skeleton frames. The blocks are interconnected by rubber pins that fit into a pair of sockets positioned on diagonally opposite corners of the panels.

U.S. Pat. No. 3,811,728 to Redemske discloses plastic modular furniture formed with individuals molded plastic base and storage modules having a plurality of grooves on the top surface thereon. The modular furniture further includes a plurality of shells for sitting, sleeping, storage and table tops having a peripheral ridge suitable for engaging the plurality of grooves on the base module. The base modules are connected together by a plurality of flexible clips that fit into a plurality of slots provided in each base module.

U.S. Patent Application No. 2006/0250052 to Davis et al. discloses a modular storage system and a method of assembling the same. Each modular storage component includes a first end provided with an integral connector and an opposite second end adapted to engage a second modular component at and with an integral connector of the second component.

However, all of these known modular furniture systems still suffer from a number of disadvantages and drawbacks. For example, the modular furniture has generally been rather plain in design and appearance and incapable of providing a variety of choices such as in furniture designs, material selections and the like. Additionally, the prior art modular furniture kits are usually constructed to form traditional pieces of furniture once assembled, and do not allow for any degree of flexibility in assembly, or the ability to be readily modified into other pieces of furniture for use in a house, office or other environment. Therefore, such known modular furniture systems have little or no utility apart from their use in the primary combinations for which they are designed and intended.

Furthermore, in many modular furniture arrangements of the prior art, assembly of the sections or modules requires complex securing or fastening devices, and thus often requires special knowledge or skills for assembling the components. Also, the various modules or elements are usually visibly connected rather than presenting a finished appearance replicating manufacture as a single unitary furnishing. On the other hand, if the fastening devices are obscured sufficiently to give the modular furnishings a solid unitary appearance, the individual modules cannot be easily separated or connected for alternative uses of the furnishings.

Still another problem encountered with many known modular systems is that such systems typically receive extensive use, which causes various elements of the system to become worn out or damaged, requiring expensive repair or replacement of large portions of the modular units. Particularly prone to such wear and damage is the upholstery, which receives direct contact and is more easily damaged than other portions.

What is desired, therefore, is an interior design system that is versatile, durable and relatively inexpensive. What is further desired is an interior design system that can be easily assembled and disassembled by a consumer, without requiring special knowledge or expensive equipment. What is also desired is an interior design system which is highly flexible and can be easily assembled into an extremely wide variety of interior design and/or furniture units that can be used in any residential or commercial space. What is further needed is an interior design system which is aesthetically pleasing and is available in a variety of finishes, textures and/or patterns that are easily replaceable and interchangeable.

SUMMARY OF THE INVENTION

Accordingly, it is an object of the present invention to provide a modular interior design and furniture system that is versatile, durable and relatively inexpensive.

It is another object of the present invention to provide a modular interior design and furniture system that is highly flexible and can be arranged into a large variety of custom interior designs and/or furniture pieces that can be used in any interior or exterior facility where furniture is needed.

It is a further object of the present invention to provide a modular interior design and furniture system that is easy for an average consumer to assemble and disassemble, and that does not require special knowledge or expensive equipment to put together.

It is yet another object of the present invention to provide a modular interior design and furniture system that is aesthetically pleasing and is available in a variety of replaceable and interchangeable finishes, textures and/or patterns.

In order to overcome the deficiencies of the prior art and to achieve at least some of the objects and advantages listed, the invention comprises an interior design unit for use in an interior design system, including a modular unit having five planar members, wherein each of the planar members has a tetragon shape and is removably attached to at least one other of the planar members, wherein each of the planar members includes four through holes for receiving a connector for attachment to at least one other interior design unit, and wherein each of the through holes is positioned at a substantially equal distance from an adjacent corner of the planar member.

In certain embodiments, each of the five planar members is a flat panel.

In some embodiments, the interior design unit further includes at least one texture panel removably attached to an outer face of at least one of the planar members via a connector received in at least one of the four through holes in the planar member. In other embodiments, the interior design unit further includes at least one cushion member removably attached to an outer face of at least one of the planar members via a connector received in at least one of the four through holes in the planar member.

An interior design system is also provided, including a plurality of modular units, and at least one connector for removable attachment of one of the modular units to at least one other of the modular units, wherein each of the modular units includes a plurality of planar members, wherein each of the plurality of planar members is removably connected to at least one other of the planar members, wherein each of the plurality of planar members includes a plurality of through holes, and wherein any of the plurality of through holes in the planar members receives the at least one connector.

In some embodiments, the plurality of planar members comprises five planar members.

In certain embodiments, the plurality of through holes in each of the plurality of planar members includes at least four through holes, and each of the through holes is positioned at a substantially equal distance from a nearest edge of the planar member to the hole.

In some embodiments, the interior design system further includes at least one texture panel removably attached to an outer face of at least one of the plurality of planar members via the at least one connector received in at least one of the plurality of through holes in the planar member. In additional embodiments, the interior design system further includes at least one cushion member removably attached to an outer face of at least one of the plurality of planar members via the at least one connector received in at least one of the plurality of through holes in the planar member.

In certain embodiments, the at least one connector comprises a middle portion with a threaded channel, a first end portion with a threaded member, and a second end portion with a threaded member, wherein the threaded channel of the middle portion receives the threaded members of the first and second end portions. In some of these embodiments, any of the plurality of through holes in the plurality of planar members receives the middle portion of the connector. In additional of these embodiments, an outer diameter of the middle portion corresponds to an inner diameter of each of the plurality of through holes such that the middle portion is securely retained in the through hole.

In certain embodiments, the interior design system further includes at least one support member received in at least one of the plurality of through holes in the planar member. In some of these embodiments, the interior design system further includes at least one support member connector including a middle portion having a threaded channel, a first end portion having a threaded member, and a second end portion having a threaded member, wherein the threaded channel of the middle portion engages with the threaded members of the first and second end portions, wherein the middle portion further includes a securing member removably attached to the middle portion for receiving the support member.

In certain embodiments, the plurality of modular units are adapted to be coupled by a plurality of connectors to form a sleeping unit, a seating unit, a storage unit, a shelving unit, a table unit, and an interior design unit.

A method for assembling an interior design system is further provided, including the steps of connecting a plurality of planar members to form a first modular unit, connecting a plurality of planar members to form at least one other modular unit, and removably connecting the first modular unit to the at least one other modular unit via at least one connector, wherein each of the planar members of the first modular unit has a plurality of through holes, wherein each of the planar members of the at least one other modular unit has a plurality of through holes, and wherein the at least one connector is inserted into at least one through hole in the first modular unit and into at least one through hole in the at least one other modular unit.

In some embodiments, the method further includes the step of removably attaching at least one texture panel to an outer face of at least one of the planar members via the connector received in at least one of the plurality of through holes. In other embodiments, the method further includes the step of removably attaching at least one cushion member to an outer face of at least one of the planar members via the connector received in at least one of the plurality of through holes.

In certain embodiments, the method further includes the step of inserting at least one support member into at least one of the plurality of through holes in the first modular unit and into at least one of the plurality of through holes in the at least one other modular unit.

In some embodiments, the step of removably connecting the first modular unit to the at least one other modular unit via at least one connector includes the steps of inserting a middle portion of the connector into a through hole in the first modular unit and into a through hole in the at least one other modular unit, wherein the middle portion has a threaded channel, engaging a threaded member of a first end portion of the connector with the threaded channel, and engaging a threaded member of a second end portion of the connector with the threaded channel.

Other objects of the invention and its particular features and advantages will become more apparent from consideration of the following drawings and accompanying detailed description.

BRIEF DESCRIPTION OF THE DRAWINGS

FIG. 15A is a front perspective view of two modular cells of the modular interior design system of FIG. 1, showing the connections between the cells.

FIG. 15B is an enlarged view of the area labeled as "15B" in FIG. 15A.

FIG. 15C is an enlarged view of the area labeled as "15C" in FIG. 15A.

FIGS. 25A-25C are front and rear perspective views and a side view, respectively, of a soft texture panel of the modular interior design system of FIG. 1.

FIG. 28A is a perspective view of a support member of the modular interior design system of FIG. 1.

FIG. 28B is a front perspective view of the modular interior design system in the configuration of a shelving unit, showing the use of the support member of FIG. 28A.

DETAILED DESCRIPTION OF THE INVENTION

Figure 1:
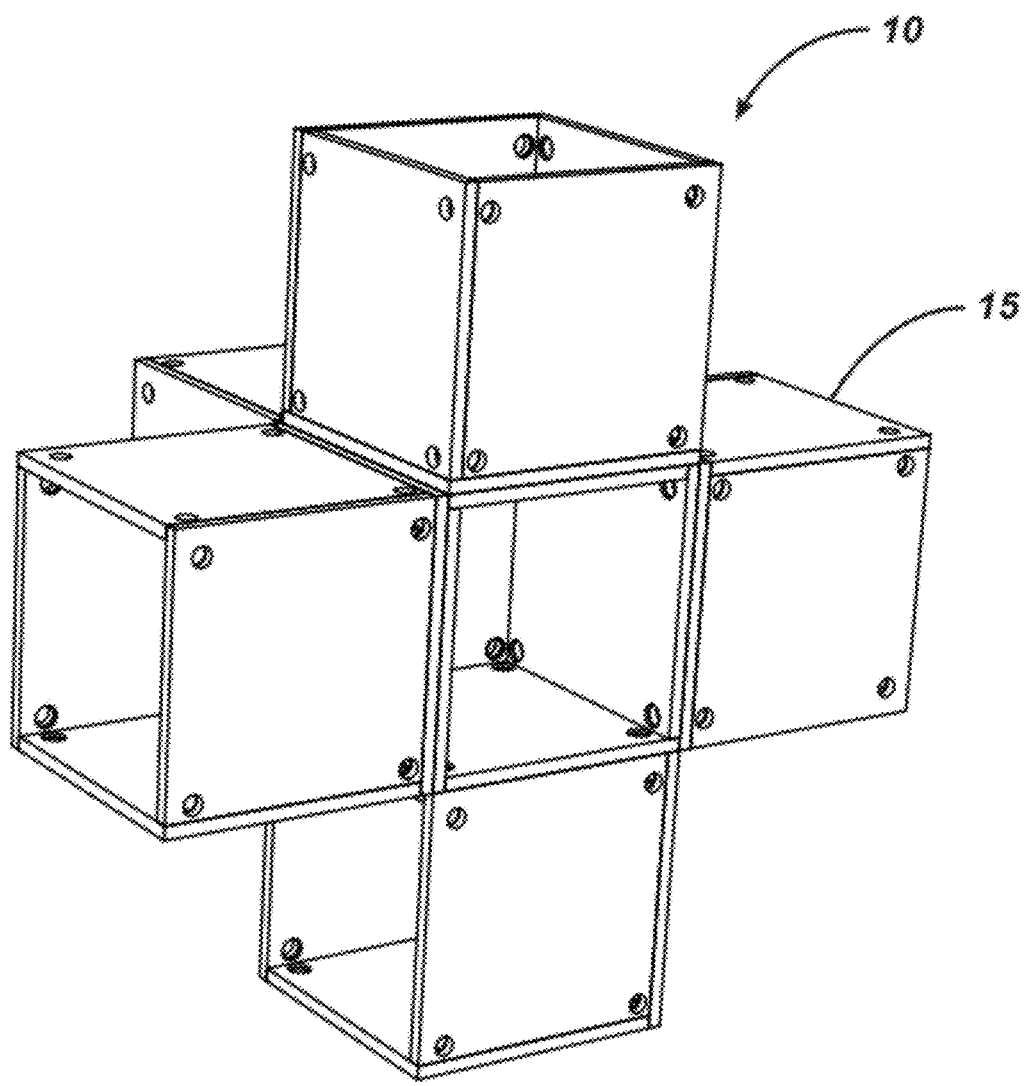
FIG. 1 is a front perspective view of a modular interior design system of the present invention.

The present teachings are described more fully hereinafter with reference to the accompanying drawings, in which the present embodiments are shown. The following description is presented for illustrative purposes only and the present teachings should not be limited to these embodiments.

As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

FIG. 1 illustrates an exemplary embodiment of a modular interior design system (10) of the present invention. The system comprises a plurality of individual modular units or cells (15) connected together to form a variety of interior design and/or furniture units, including, but not limited to, sofas, sitting, shelving, beds, tables, bar tops, chairs, office cubicles, desks, etc.

In the illustrated embodiment, the modular interior design system (10) comprises six individual modular cells (15), each cell being formed with five panels, and each cell having five connecting faces and one open face. It should be noted, however, that the modular cell can also have a different number of connecting faces, e.g. six connecting faces or four connecting faces, without departing from the spirit of the present invention.

The modular cells (15) are made with any type of material that is suitable for a particular furniture design and style. For example, the panels of the modular cell (15) can comprise glass, wood, plastic, plexiglass, fiberglass, metal, stone, PVC, or any other suitable material. In certain advantageous embodiments, the modular cells (15) are made with a composite wood material that has suitable characteristics, such as hardness, durability, strength, and texture.

Figure 2:
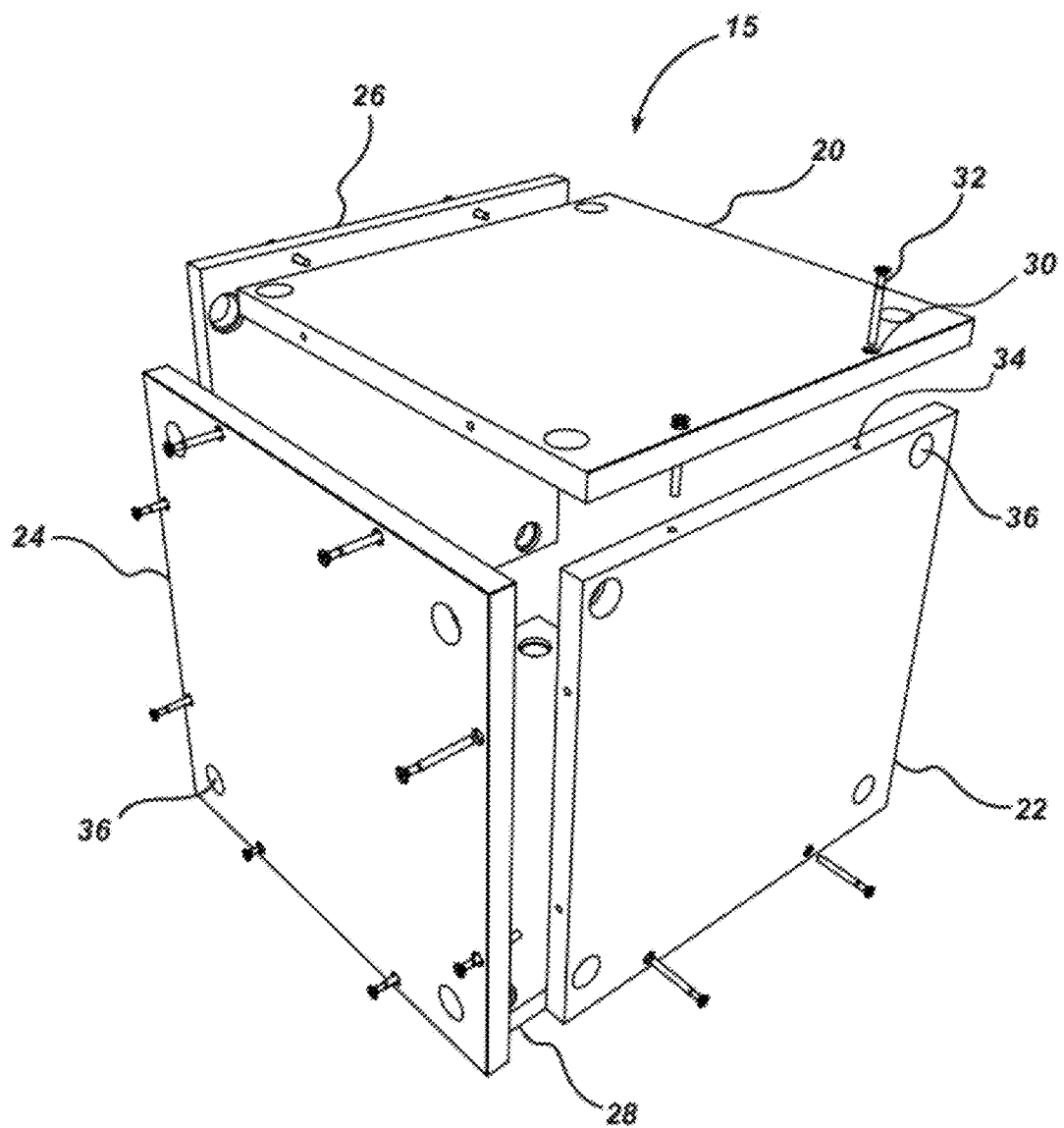
FIG. 2 is a perspective view of a modular cell of the modular interior design system of FIG. 1, showing removable attachment of the modular cell panels.

An exemplary embodiment of the modular cell (15) is shown in FIG. 2. The modular cell (15) comprises five identical panels (20, 22, 24, 26, 28), each having a substantially square shape such that the panels form a cube-like modular cell structure when assembled. It should be understood, however, that the panels (20, 22, 24, 26, 28) can have other shapes, e.g. rectangular, trapezoidal, or the like in accordance with the present invention. Each panel (20, 22, 24, 26, 28) has an interior face and an exterior face, both of which are substantially flat. The exterior face can include a surface texture or indicia to make it more aesthetically pleasing. The panels (20, 22, 24, 26, 28) can have any suitable thickness, depending on a desired size and use of the modular system. In certain advantageous embodiments, each of the modular cell panels has a thickness of about 15 mm to 25 mm.

The panels (20, 22, 24, 26, 28) are detachably coupled to each other by any suitable connecting means, such as nails, screws or glue. This way, the panels can be shipped to the purchaser in a compact container, and then assembled into the modular cells at the purchaser's house or office. It should be noted that in other embodiments the modular cell (15) can be manufactured as a unitary unit, for example, a molded plastic unit.

In one possible embodiment shown in FIG. 2, each of the panels (20, 22, 24, 26, 28) comprises at least one through hole (30) positioned on the exterior face of the panel and adjacent to the edge of the panel for accommodating a connecting device (32), such as a screw or a nail. Each of the panels (20, 22, 24, 26, 28) also includes at least one hole (34) positioned on an outer edge of the panel corresponding to the through hole (30) in the adjoining panel. During the assembly of the modular cell (15), the connecting device (32) is passed through the through hole (30) and into the hole (34) in the adjoining panel such that the connecting device (32) is secured within the panel (22), thereby fastening the two panels together. When a disassembly of the modular cell (15) is desired, the purchaser can simply disengage the connecting members (32) and pull the panels (20, 22, 24, 26, 28) apart.

Figure 3A:
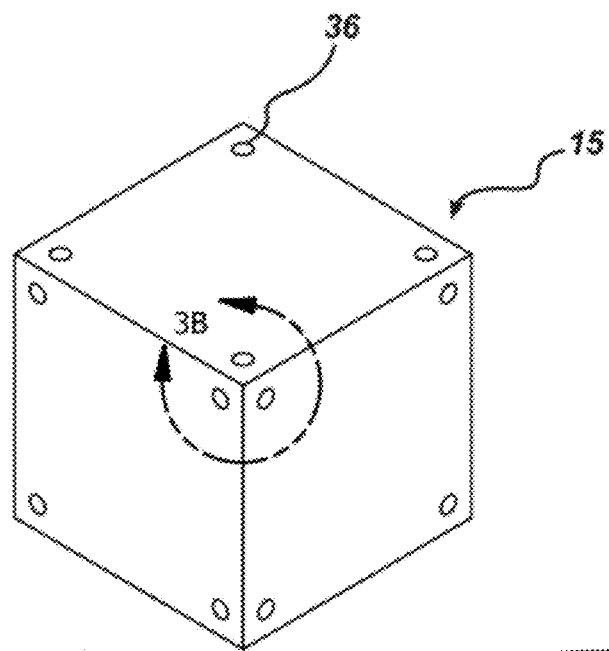
FIG. 3A is perspective view of the assembled modular cell of FIG. 2.
Figure 3B:
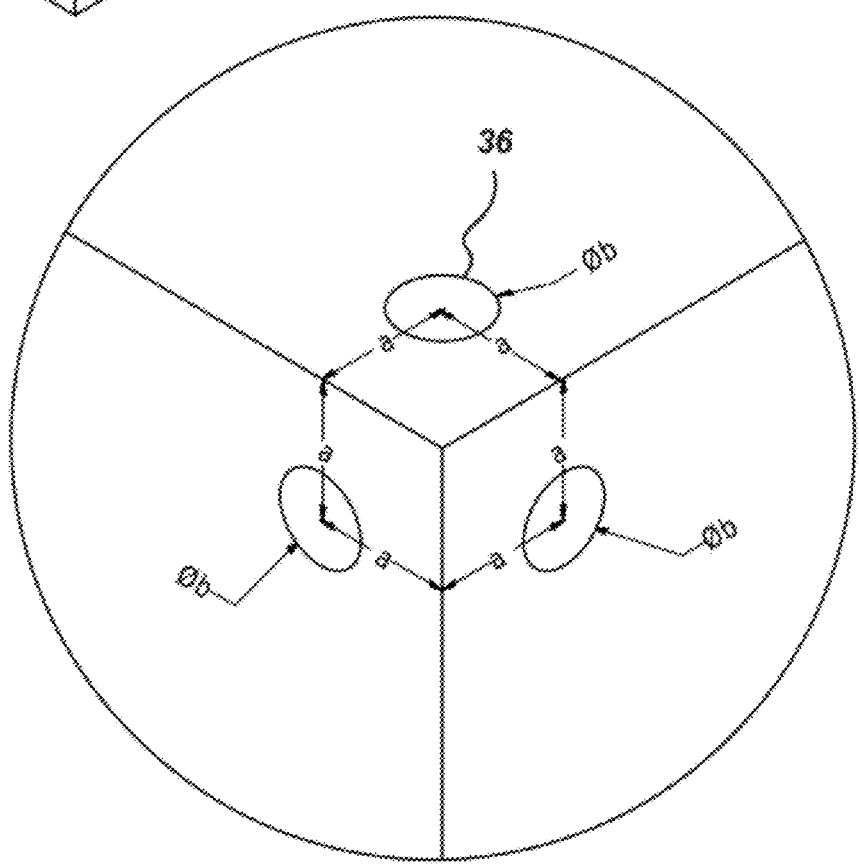
FIG. 3B is an enlarged perspective view of the area labeled as "3B" in FIG. 3A.
Figure 4A:
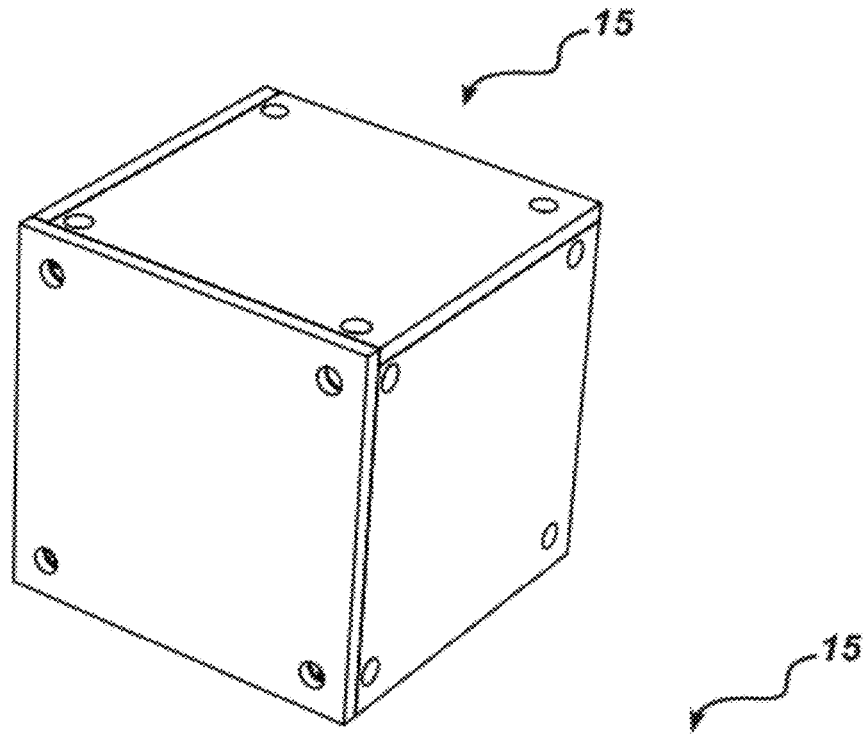
FIGS. 4A and 4B are front and rear perspective views of a base cell of the modular interior design system of FIG. 1.
Figure 4B:
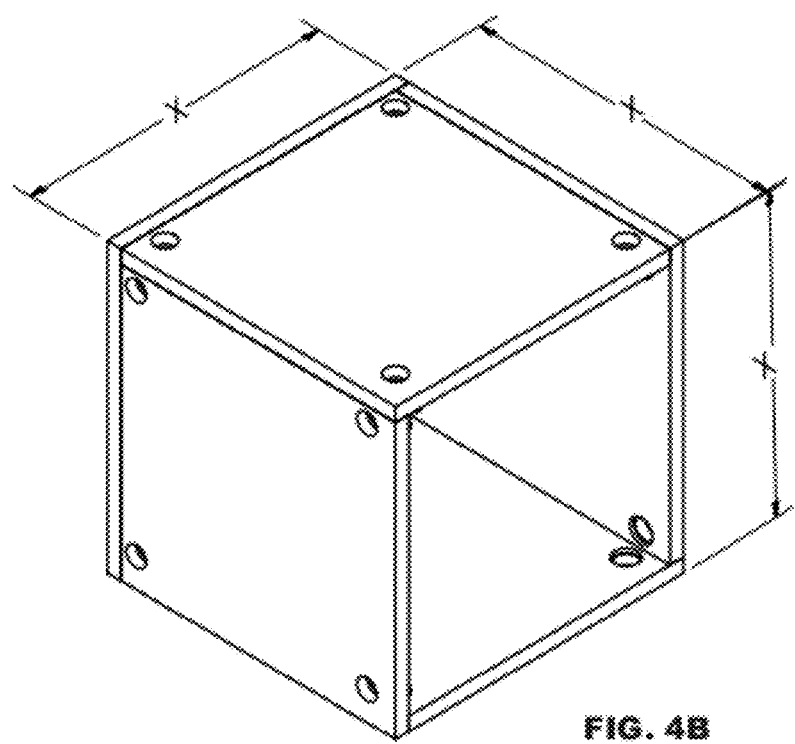

Each of the panels (20, 22, 24, 26, 28) further comprises a plurality of locking holes for removable coupling of the modular cells (15) to each other. In one possible embodiment illustrated in FIGS. 2 and 3, each of the panels (20, 22, 24, 26, 28) has four locking holes (36) positioned at a substantially equal distance (a) from the nearest edge of each panel. Each of the locking holes (36) preferably has a substantially circular shape with an equal diameter (b) such that it can accommodate the same type of a locking device. The locking holes (36) are preferably positioned on each of the five faces of the modular cell (15), such that any of the faces of one modular cell can be connected to any of the faces of another modular cell, thereby allowing for a wide variety of interior design and/or furniture configurations. The open face of each modular cell (15) is used to access the locking device, and can also be used for storage or as a design element.

FIGS. 4-13 illustrate various possible embodiments of the modular cell (15) of the modular interior design system (10) in accordance with the present application. FIGS. 4A and 4B show a front and back view of a base cube-shaped modular cell (15). In this embodiment, a length (x), width (x) and height (x) of the assembled modular cell are substantially the same.

Figure 5A:
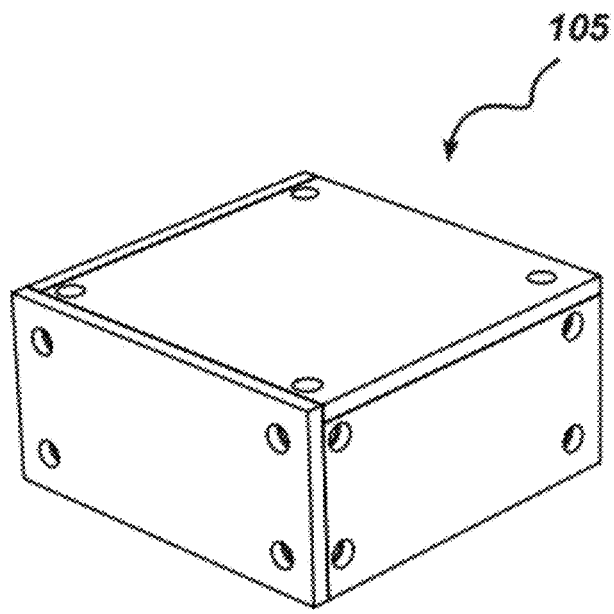
FIGS. 5A and 5B are front and rear perspective views of a half cell of the modular interior design system of FIG. 1.
Figure 5B:
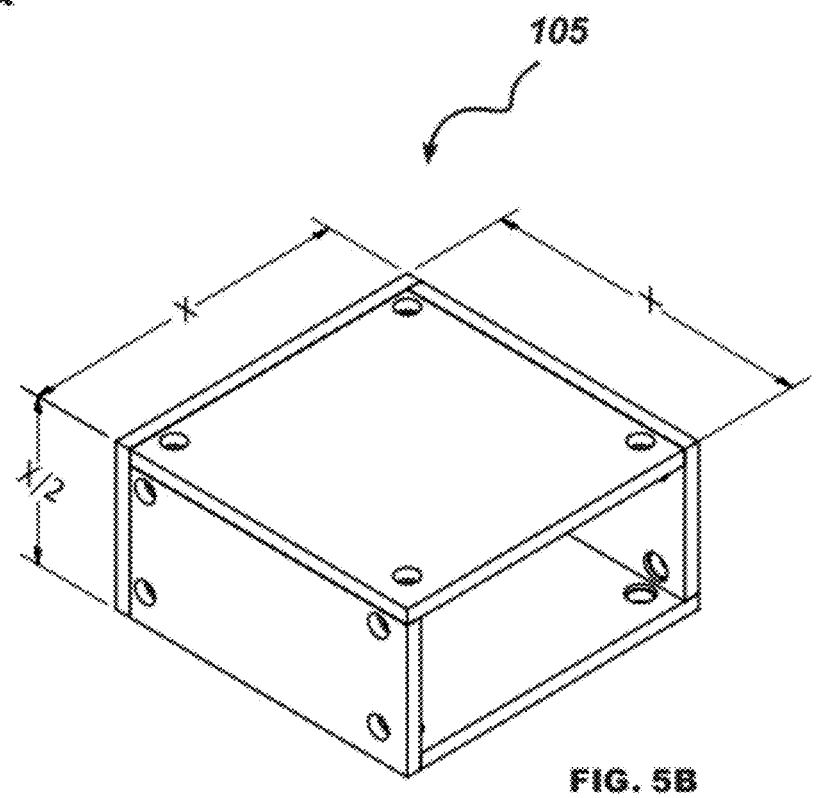

FIGS. 5A and 5B illustrate an embodiment of the modular system wherein the assembled modular cell (105) has a length (x) that is substantially equal to a width (x), and a height (x/2) which is twice less than the width (x) and the length (x) of the cell. In this embodiment, two modular cells (105) can be stacked on top of each other to form a unit that is dimensionally equivalent to the cube-shaped base cell (15) shown in FIGS. 4A and 4B.

Figure 6A:
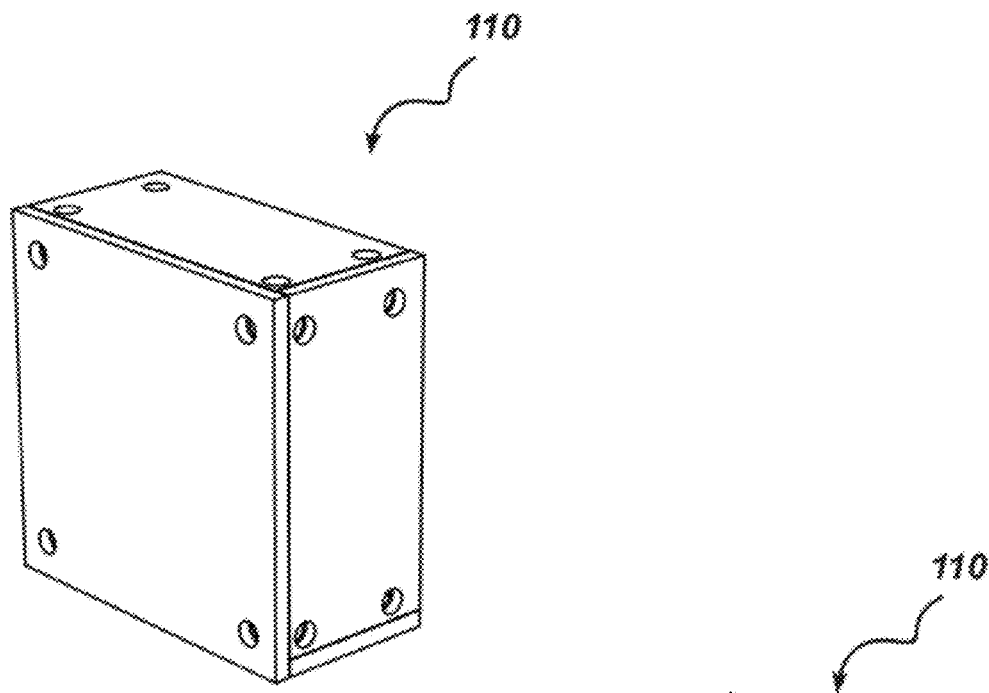
FIGS. 6A and 6B are front and rear perspective views of another half cell of the modular interior design system of FIG. 1.
Figure 6B:
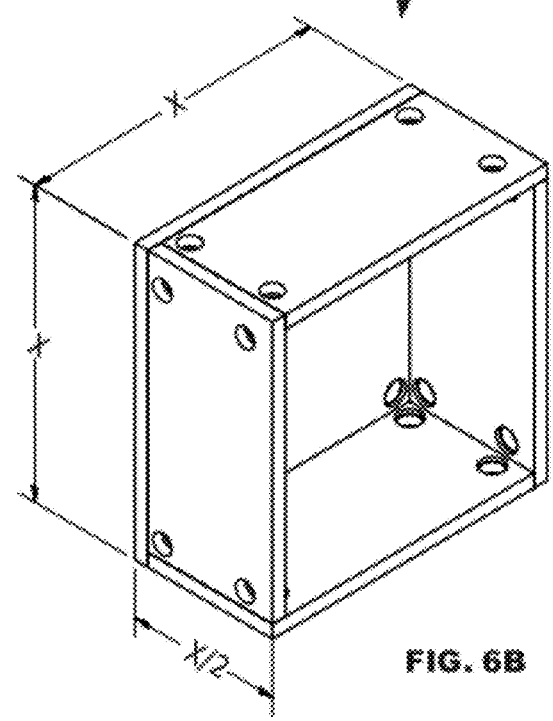

FIGS. 6A and 6B illustrate a front and back perspective views of another embodiment, in which the assembled modular cell (110) has a length (x) that is substantially equal to a height (x), and a width (x/2) which is twice less than the width (x) and the length (x) of the cell. The two modular cell units (110) can be attached to one another to form the cube-shaped cell unit.

Figure 7A:
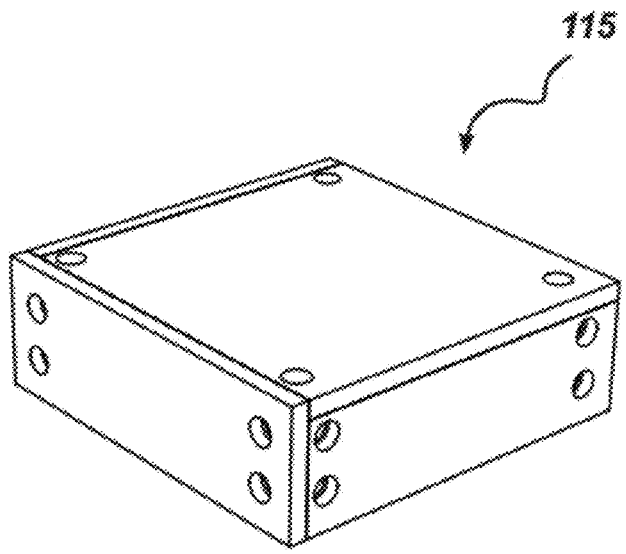
FIGS. 7A and 7B are front and rear perspective views of a flat cell of the modular interior design system of FIG. 1.
Figure 7B:
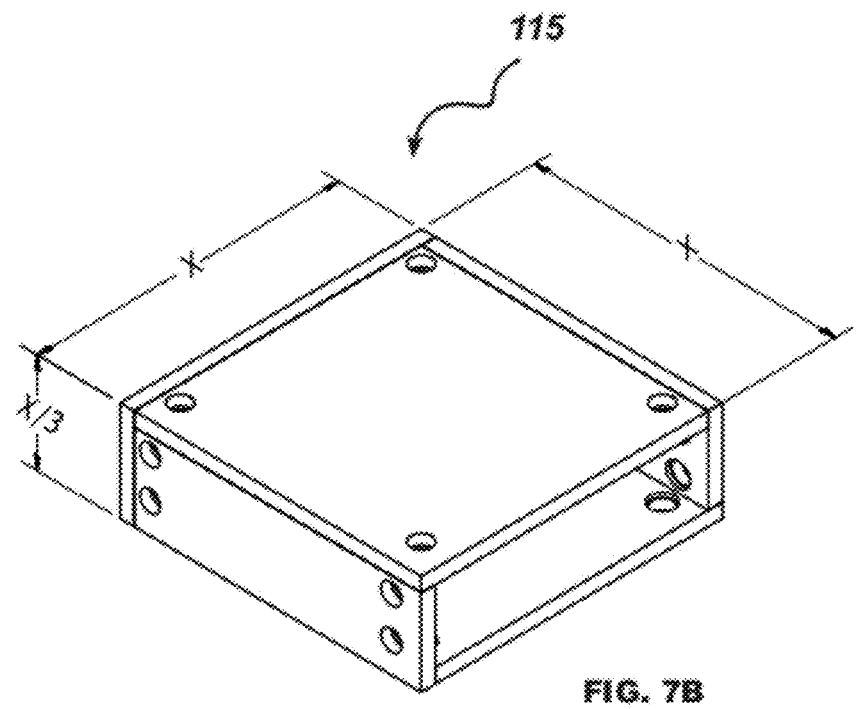

FIGS. 7A and 7B illustrate an embodiment of the present invention wherein the assembled modular cell (115) has the length (x) that is substantially equal to the width (x), and the height (x/3) which is three times less than the width (x) and the length (x) of the cell. Three of these cell units (115) can be stacked on top of each other to form a cube-shaped cell similar to the cell shown in FIGS. 4A and 4B.

Figure 8A:
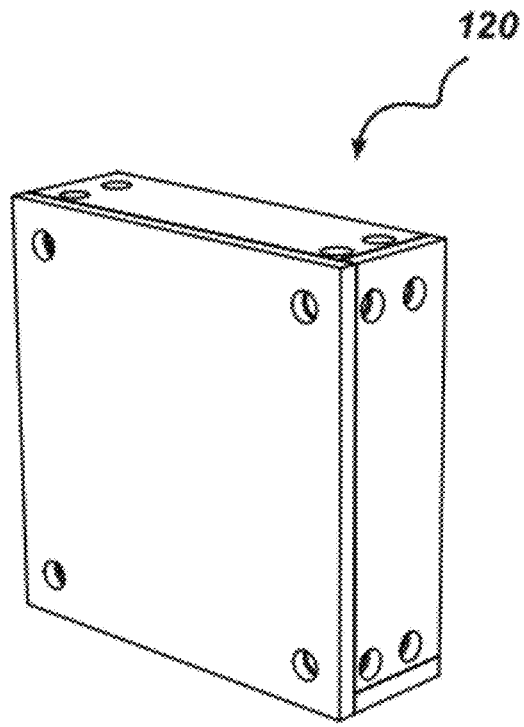
FIGS. 8A and 8B are front and rear perspective views of another flat cell of the modular interior design system of FIG. 1.
Figure 8B:
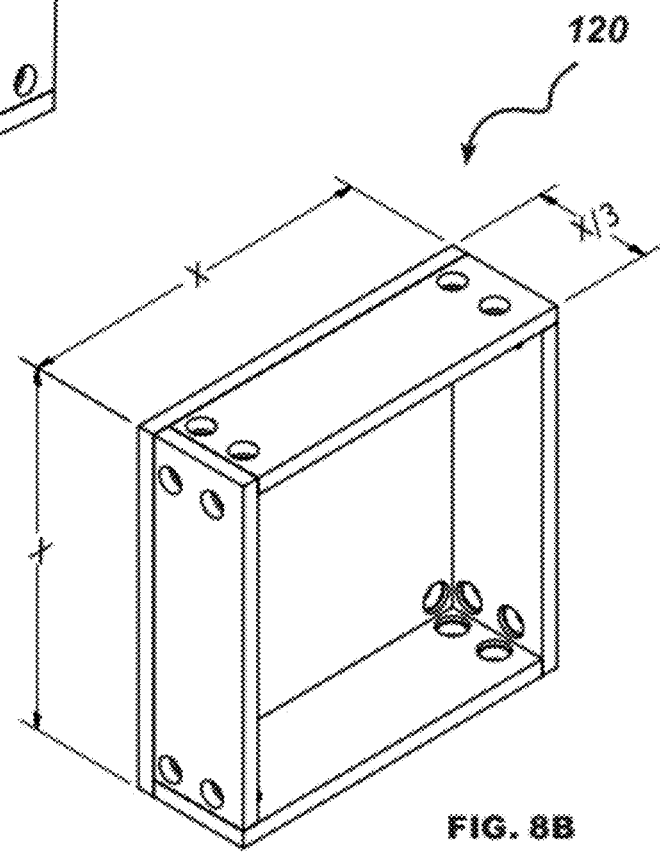

FIGS. 8A and 8B illustrate a front and back perspective views of another embodiment of the present invention, in which the modular cell (120) has a length (x) which is substantially the same as the height (x), and a width (x/3) which is three times less than the length (x) and the height (x) of the cell. In this embodiment, three modular sells (120) can be assembled into a unit that is dimensionally similar to the cube-shaped base cell unit (15).

Figure 9A:
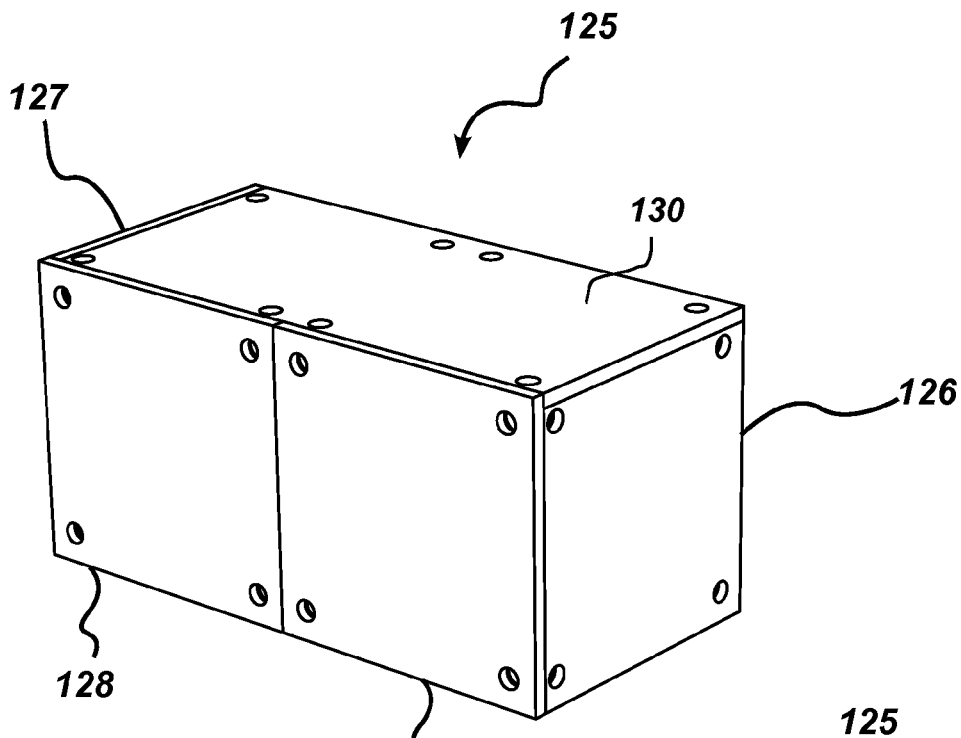
FIGS. 9A and 9B are front and rear perspective views of a long base cell of the modular interior design system of FIG. 1.
Figure 9B:
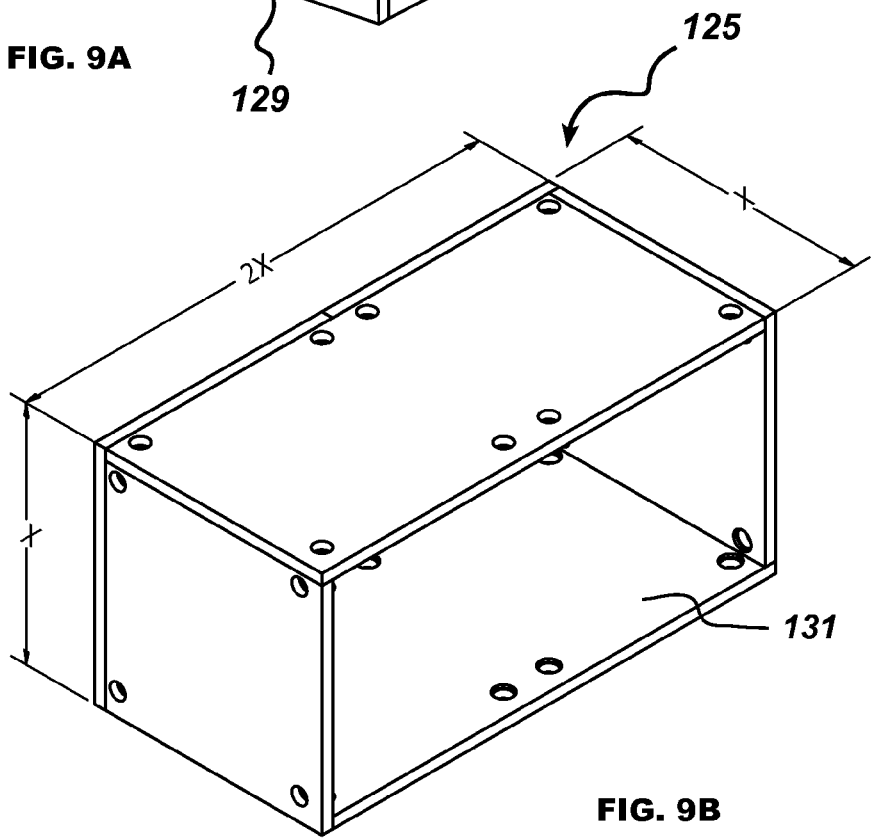

FIGS. 9A and 9B illustrate an embodiment of a long base cell (125). The assembled long cell (125) has a width (x) that is substantially the same as the height (x), and a length (2x) that is twice longer than the width (x) and the height (x). As shown in FIG. 9A, the cell (125) preferably comprises four cube-shaped panels (126, 127, 128, 129) forming front, left side and right side faces of the cell, and two rectangular-shaped panels (130, 131) forming the top and bottom faces of the cell. As shown in FIG. 9B, the back face of the cell (125) is left open for access the locking devices and/or for storage. Dimensionally, the long base cell (125) is similar to two cube-shaped base cells (15) put together.

Figure 10A:
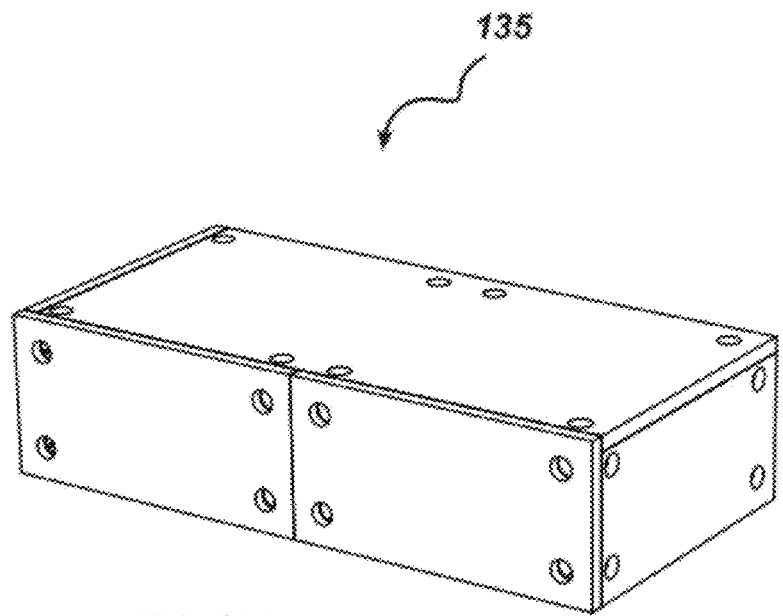
FIGS. 10A and 10B are front and rear perspective views of a long half cell of the modular interior design system of FIG. 1.
Figure 10B:
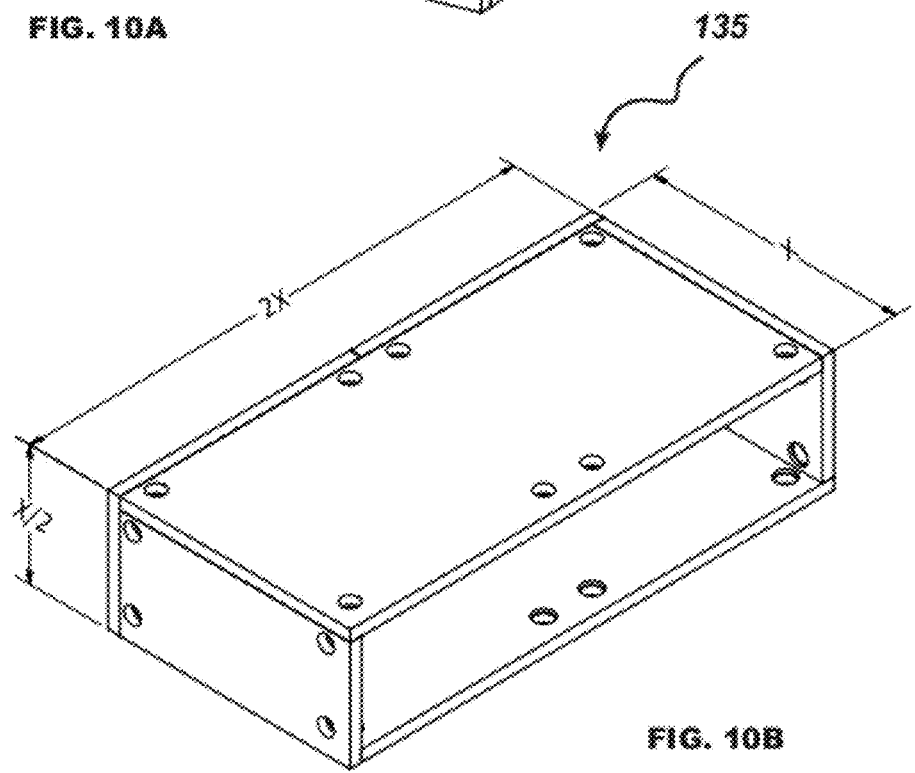

FIGS. 10A and 10B illustrate another embodiment of the present invention, wherein the assembled modular cell (135) has a width (x), a length (2x) that is twice longer than the width, and a height (x/2) which is twice less than the width (x) and four times less than the length (2x) of the cell. Two of the modular cells (135) can be stacked on top of each other to form a unit that is dimensionally similar to the long base cell (125).

Figure 11A:
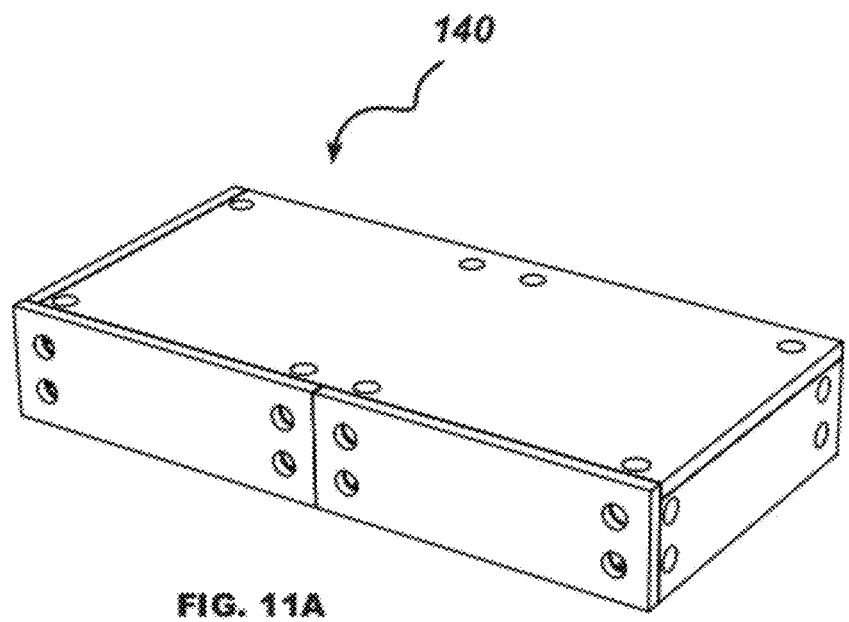
FIGS. 11A and 11B are front and rear perspective views of a long flat cell of the modular interior design system of FIG. 1.
Figure 11B:
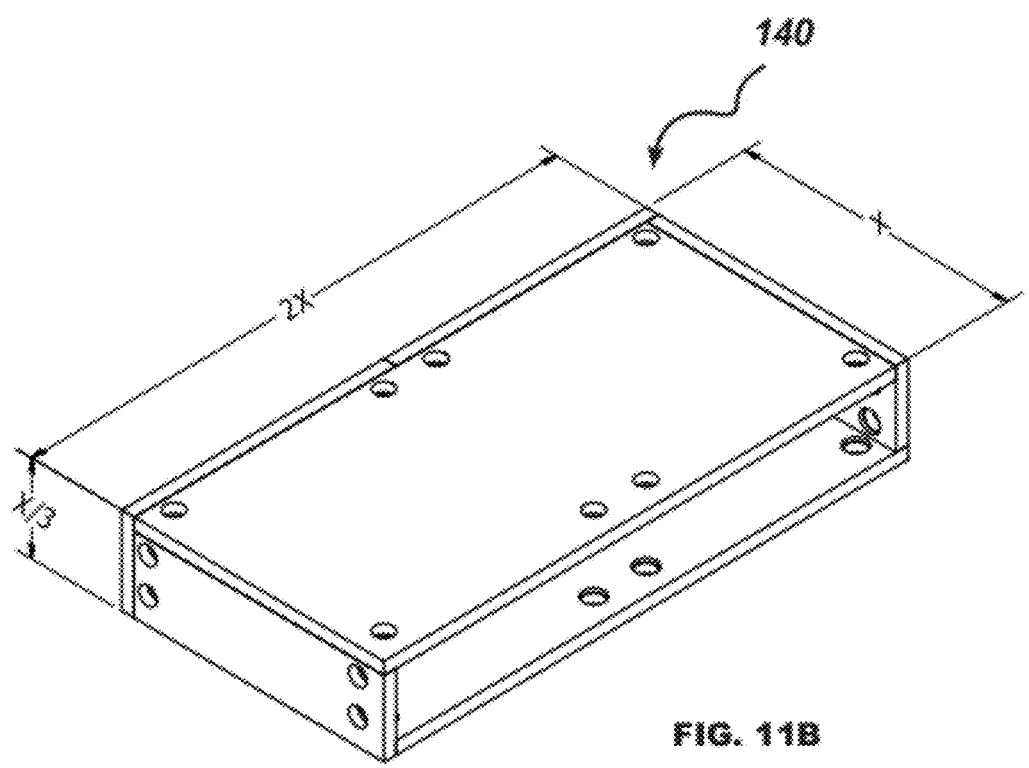
Figure 12A:
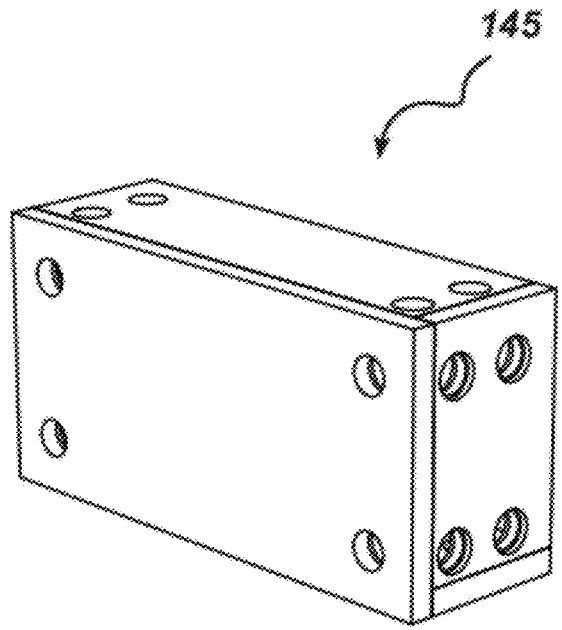
FIGS. 12A and 12B are front and rear perspective views of a thin half cell of the modular interior design system of FIG. 1.
Figure 12B:
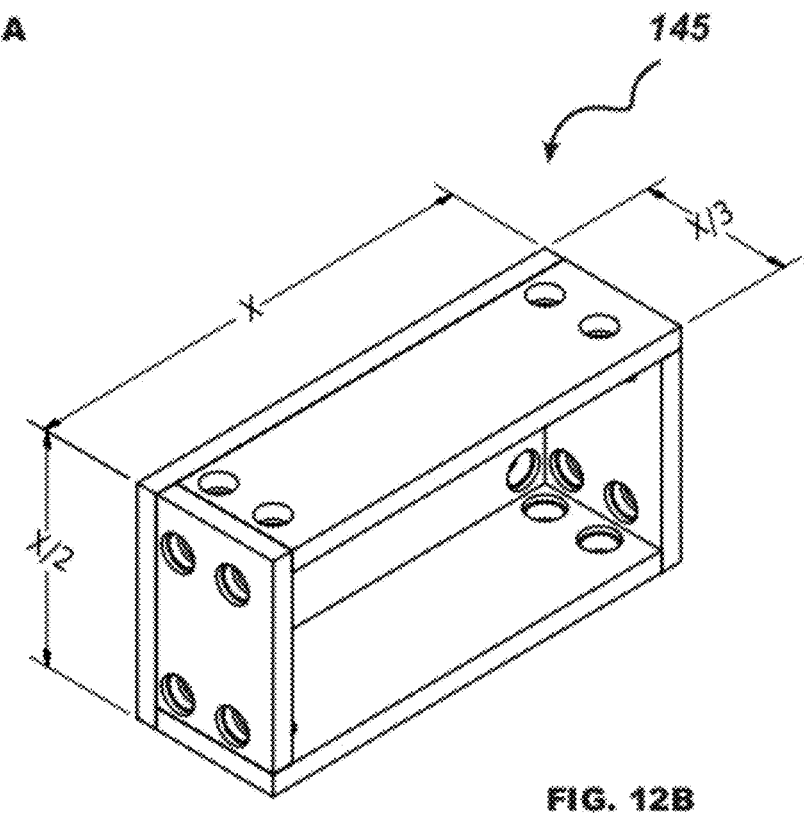
Figure 13A:
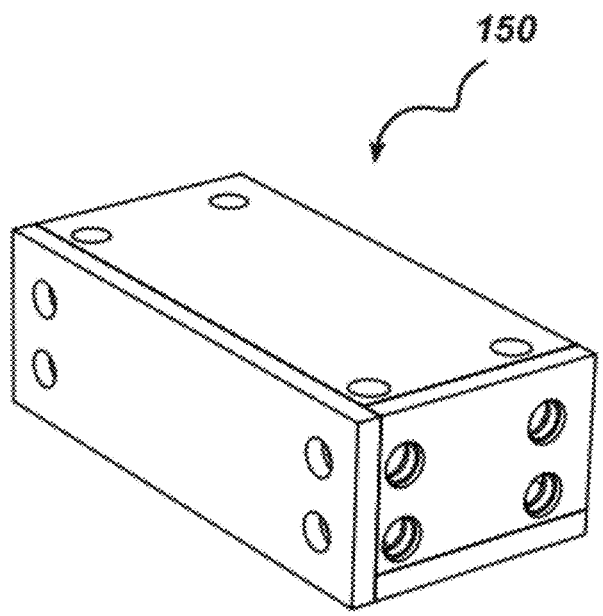
FIGS. 13A and 13B are front and rear perspective views of a thin flat cell of the modular interior design system of FIG. 1.
Figure 13B:
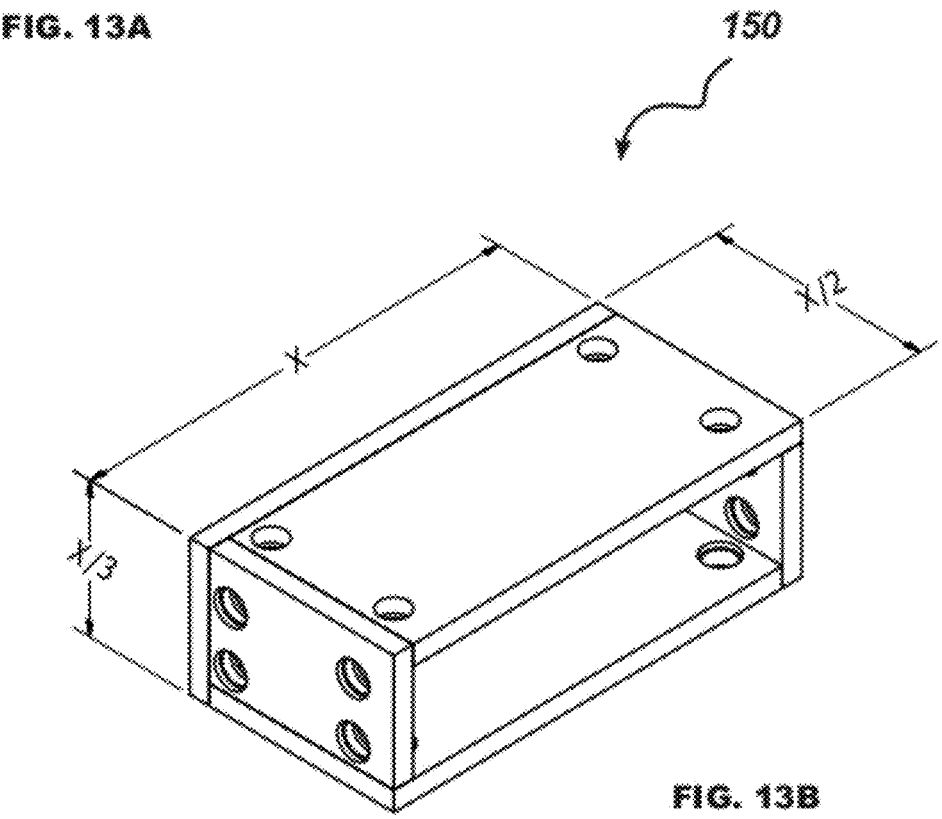

FIGS. 11A and 11B illustrate front and back perspective views of yet another embodiment, in which the assembled modular cell (140) has a width (x), a length (2x) that is twice longer than the width (x), and a height (x/3) which is three times less than the width (x) and six times less than the length (2x) of the cell. If desired, three modular cells (14) may be attached to each other to form a unit dimensionally similar to the long base cell (125).

FIGS. 12A-12B and 13A-13B illustrate additional thin modular cell embodiments (145) and (150). The thin half cell (145) shown in FIGS. 12A and 12B has a length (x), a width (x/3) that is three times shorter than the length (x) and a height (x/2) that is twice shorter than the length (x). Six thin half cells (145) may be attached together to form a base cube-shaped cell, such as the cell (15) shown in FIGS. 4A-4B. The thin flat cell (150) illustrated in FIGS. 13A and 13B has a length (x), a width (x/2) that is twice less than the length (x), and a height (x/3) that is three times less than the length (x). Similarly, six thin flat cells (150) may be stacked together if desired to form a unit dimensionally equivalent to the base cube-shaped cell (15).

As described above, each of the modular cells includes a plurality of locking holes for removable coupling of the modular cells to each other. The modular cells are coupled together by using any suitable connector. The connector may be removable or may be made integral with the panels that form each modular cell (15). The connector is preferably of a type that is easy for the purchaser to engage and disengage such that the interior design system can be easily assembled and disassembled when desirable.

Figure 14A:
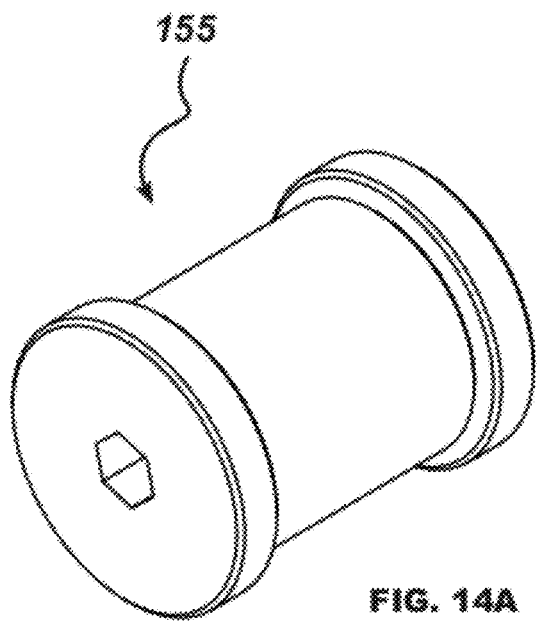
FIGS. 14A and 14B are side perspective view of a connector used in the modular design system of FIG. 1.
Figure 14B:
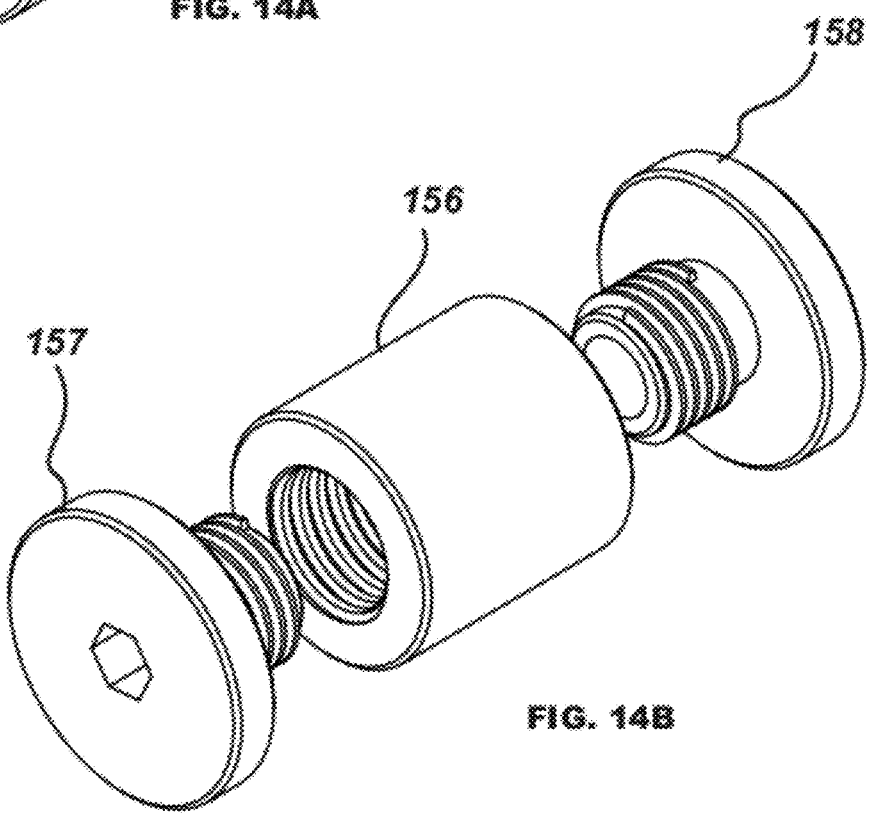

FIGS. 14A and 14B illustrate one possible embodiment of the connector (155) in accordance with the present invention. The connector (156) includes a cylindrical middle portion having a threaded inner surface, and two threaded screw members (157, 158). As shown in FIG. 14B, the screw member (157, 158) fit inside the middle portion (156) and engage with the threaded inner surface of the middle portion such that the screw members (157, 158) are retained within the middle portion (156).

FIGS. 15A-15C illustrate the assembly of two modular cells using the exemplary embodiment of the connector shown in FIGS. 14A-14B. The two modular cells (160, 161) are positioned adjacent to each other such that the locking holes in the side panel (162) of the first cell (161) are aligned with the locking holes in the corresponding side panel (163) of the second cell (160). After the two cells are properly aligned, the middle portion (156) of the connector in inserted through the corresponding locking holes in both cells, as shown in FIGS. 15B and 15C. Preferably, the diameter of the locking holes is only slightly larger than the diameter of the middle portion (156) of the connector to ensure a snug and secure fit of the connector within the holes. Then, each of the screw members (157, 158) is threaded onto the middle portion (156) to secure the two modular cells (160, 161) to each other. It should be noted that the connector may be provided with one screw member already engaged with the middle portion, such that it is only necessary to engage the second screw member with the middle portion during the assembly. During the assembly and disassembly, the connectors are preferably accessed through the open face in each modular cell.

In addition to the modular cells, the interior design system of the present invention preferably also includes a plurality of cushion members. The cushion members can come in a variety of sizes that correspond to the variety of modular cell sizes. The cushions members can also have a variety of shapes depending on a desired type of furniture and/or interior design system. As illustrated below, the cushion members can be used as seating surface, e.g. for a chair or sofa, or as sleeping surface, e.g. a bed. Each cushion member is preferably made with any suitable cushioning material, such as memory foam or any other type of foam, and preferably has a removable cover. The removable cover is made out of any suitable material, such as fabric, leather, faux leather, etc., and may be provided in a variety of colors to enhance the aesthetic and stylistic appeal of the furniture and/or interior design system.

Figure 16A:
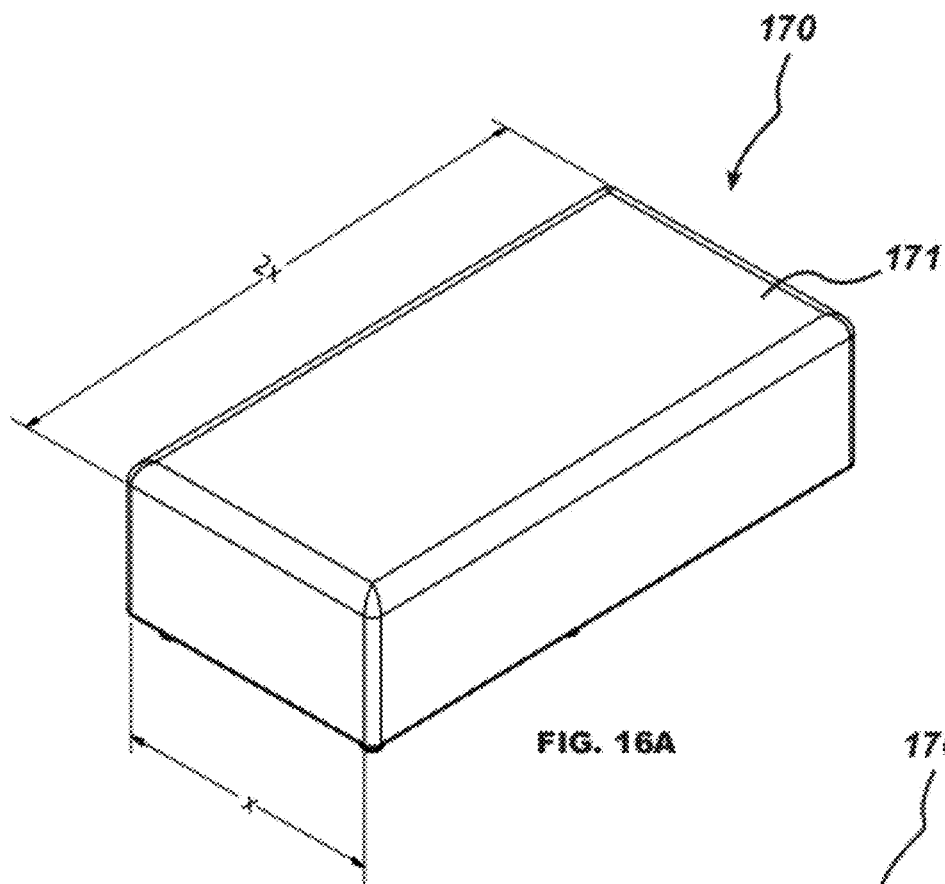
FIGS. 16A and 16B are top and bottom perspective views of a seat cushion member of the modular interior design system of FIG. 1.

FIG. 16A illustrates a top view of one possible embodiment of a seating cushion member (170). The seating cushion member (170) has a length and a width that correspond to the width and length of the modular cell to which the cushion member is to be attached. A height of the seating cushion member (170) is preferably less than the height of the modular cell so that back or head cushion members, discussed below, can also be attached to the cell to provide for a comfortable seating arrangement. The seating cushion (170) preferably has a flat top surface (171) with rounded edges and a flat bottom surface (172) with at least one connector (173). The positioning of the connector (173) preferably corresponds to the positioning of at least one locking hole in the modular cell to which the cushion member (170) is to be attached.

Figure 16B:
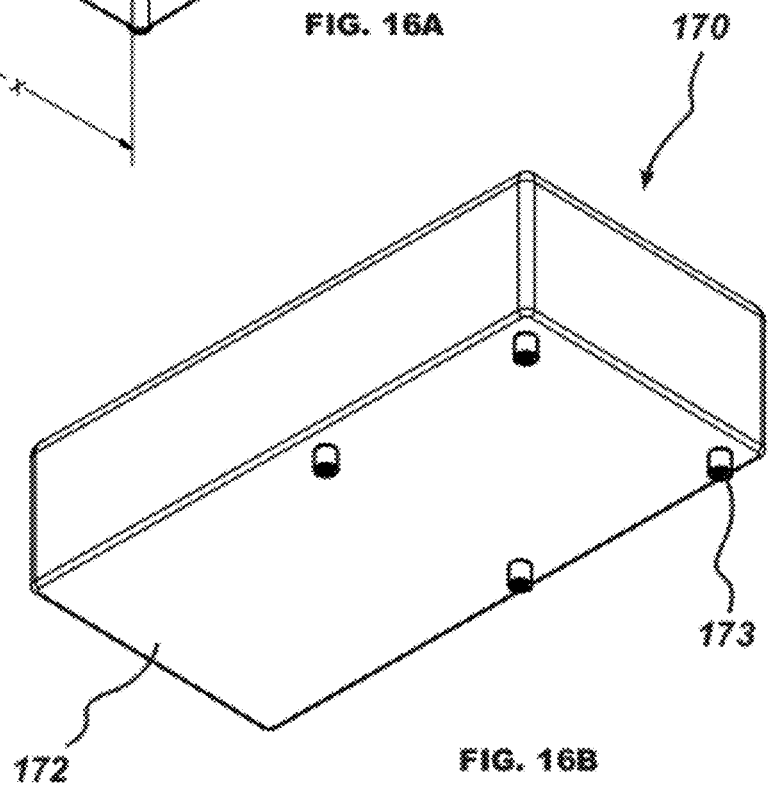

In the embodiment illustrated in FIG. 16B, the connector (173) is a cylindrical protrusion extending downwards from the bottom surface (172) of the seating cushion member (170). During the assembly of the interior design system, the seating cushion member (170) is placed over the modular cell such that the connector (173) is aligned with at least one locking hole on the top surface of the cell. The connector (173) is then fitted into the locking hole, which preferably has an inner diameter only slightly larger than the outer diameter of the connector to provide a secure attachment of the cushion member to the modular cell.

Figure 17A:
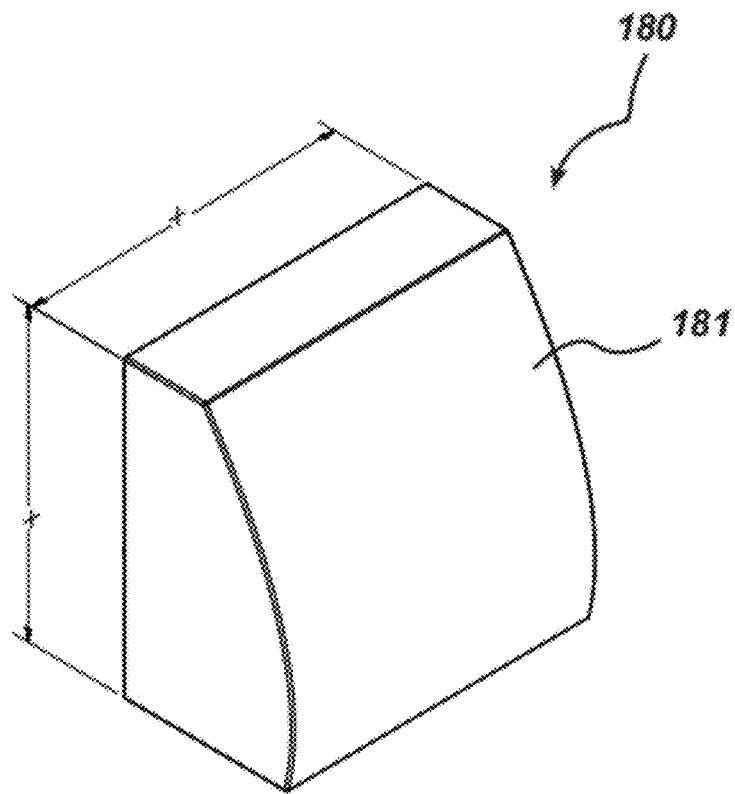
FIGS. 17A and 17B are front and rear perspective views of a back cushion member of the modular interior design system of FIG. 1.
Figure 17B:
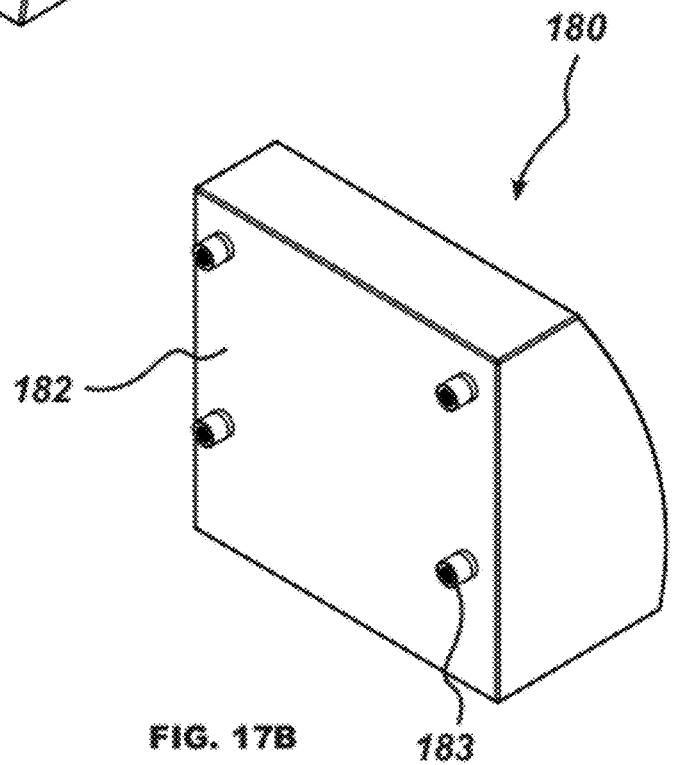

FIGS. 17A and 17B illustrate a front and back views of a back cushion member (180). The back cushion member has a front side (181) which preferably has a downwardly sloping surface to provide for a comfortable seating arrangement. The back cushion member (181) also has a back side (182) that includes at least one connector (183) similar to the connector (173) described above. During the assembly, the connector (183) is coupled with a corresponding locking hole on a front face of the modular cell to which the back cushion member (180) is to be attached. The height and width of the back cushion member (180) is preferably the same as the height and width of the corresponding modular cell.

Figure 18A:
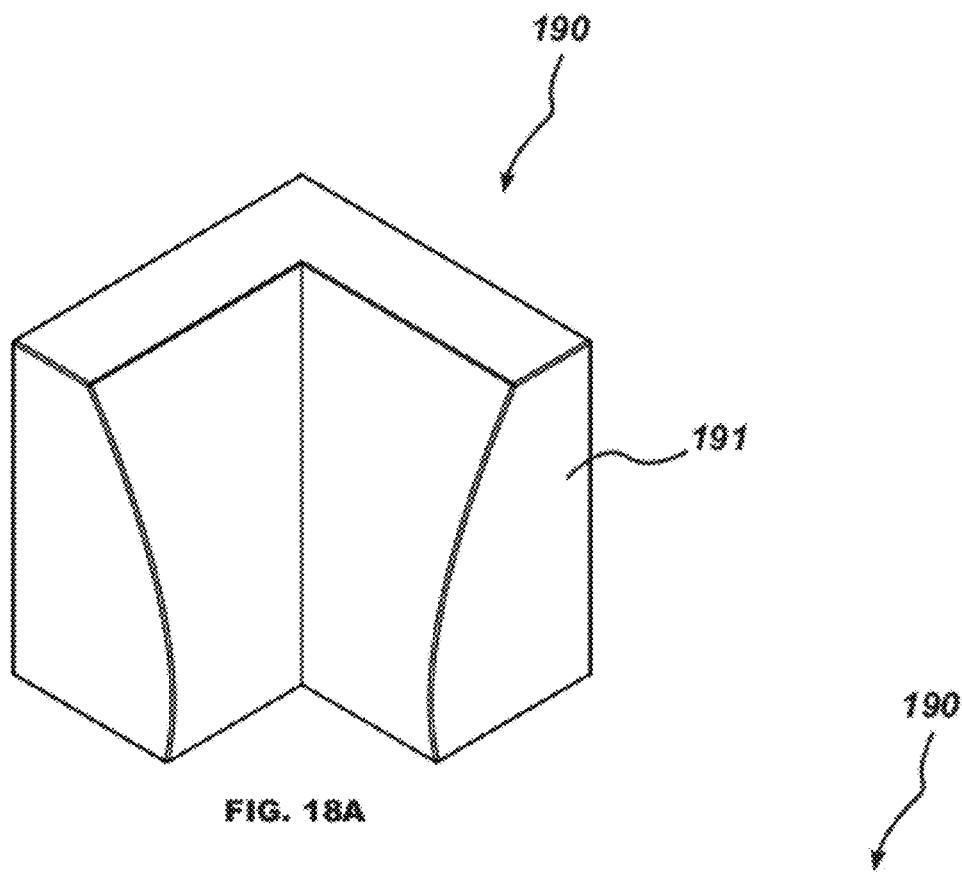
FIGS. 18A and 18B are front and rear perspective views of a corner cushion member of the modular interior design system of FIG. 1.
Figure 18B:
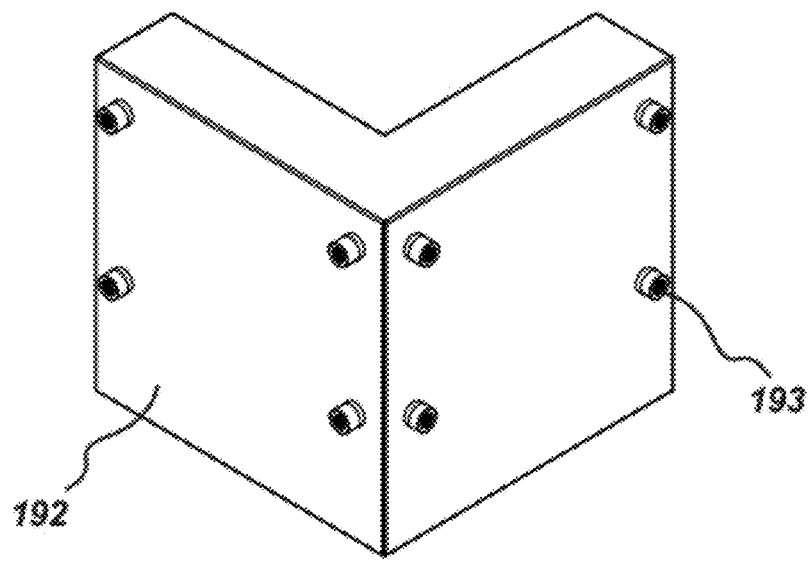

Another possible embodiment of a cushion member, a corner cushion member (190), is illustrated in FIGS. 18A and 18B. The corner cushion member (190) is designed to fit into right angle corners of the assembled piece of furniture/interior design system of the present invention. Similar to the back cushion member discussed above, the corner cushion member (190) preferably has a front side (191) with a downwardly sloping surface for comfortable seating, and a back side (192) with at least one connector (193) to a removable attachment to two corresponding modular cells. It should be noted that the back cushions and/or corner cushions of other shapes and dimensions can be provided without departing from the spirit of the present invention. For example, U-shaped or L-shaped cushion members can be provided to accommodate various furniture units, such as chairs or sectionals.

Figure 19A:
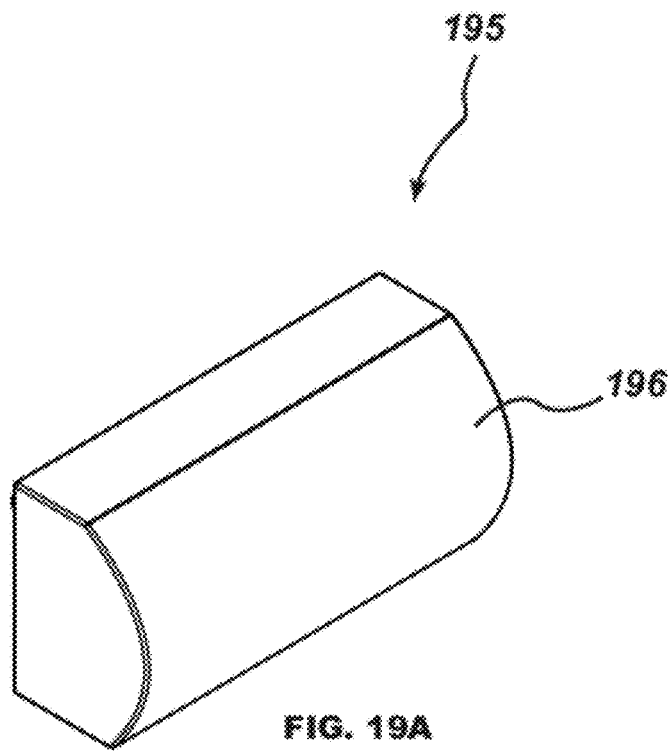
FIGS. 19A and 19B are front and rear perspective views of a head cushion member of the modular interior design system of FIG. 1.
Figure 19B:
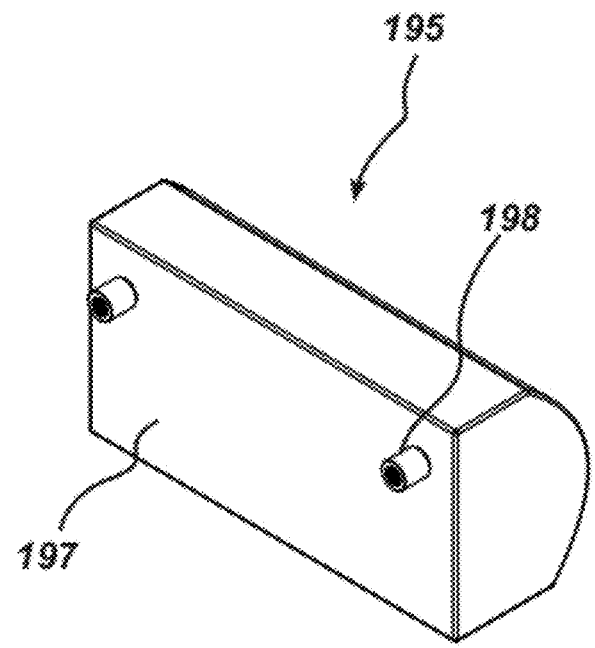

FIGS. 19A and 19B illustrate yet another possible embodiment of the cushion member of the interior design system in accordance with the present invention. This head cushion member (195) is used as a head rest, and is preferably attached to a modular cell just above the back cushion member (180) and the corner cushion member (185). The head cushion member (195) has a front side (196) with a preferably smooth curved surface designed to accommodate the shape of a person's head and neck to provide a comfortable resting surface. The head cushion member (195) also has at least one connector (198) provided on a back side (197) of the cushions member and capable of removably engaging with at least one locking hole in the corresponding modular cell unit.

Figure 20:
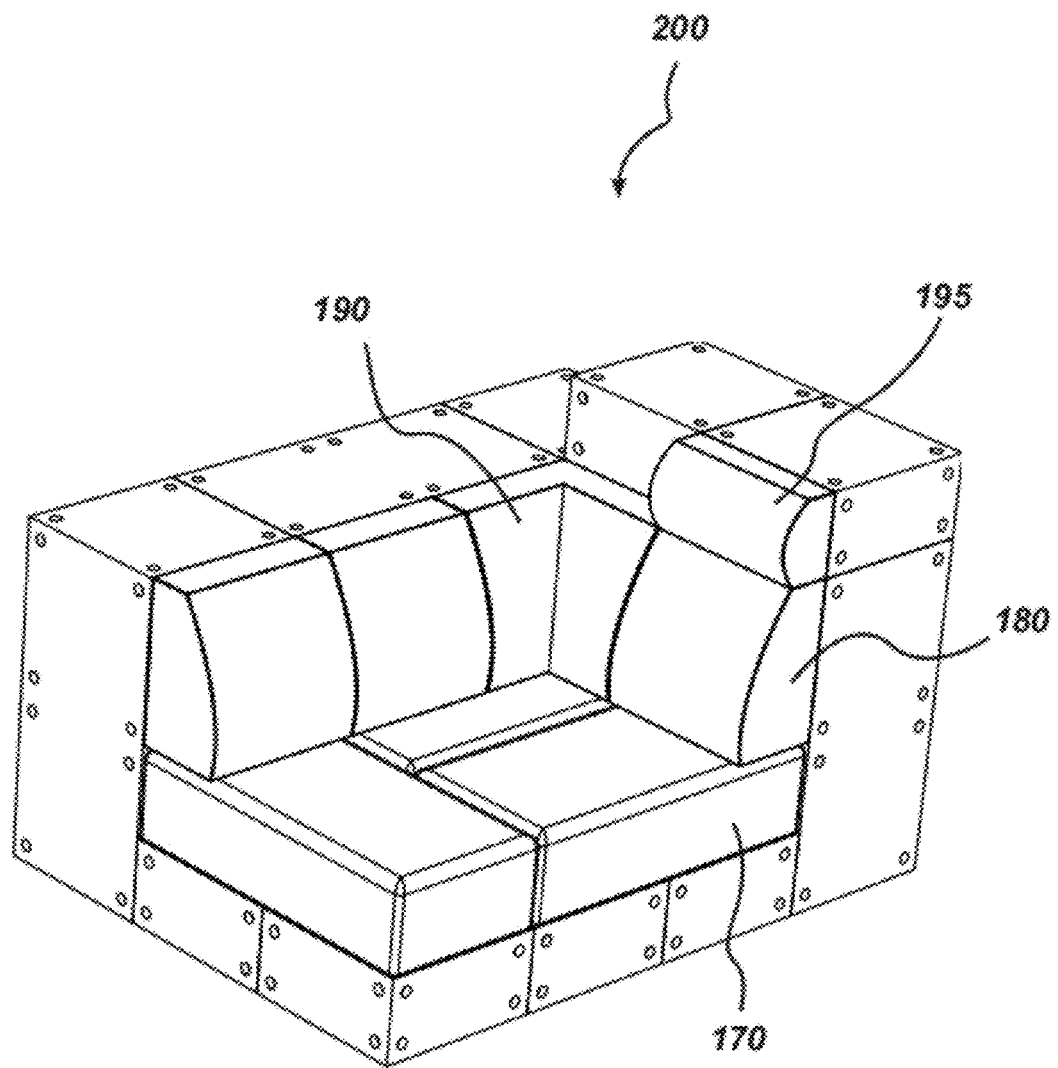
FIG. 20 is a front perspective view of the modular interior design system in the configuration of a seating unit, showing the use of various cushion members.

An exemplary embodiment of a seating unit (200) of the modular interior design system is shown in FIG. 20. The seating unit (200) comprises modular cell units of various sizes connected together to provide a seating surface. The seating unit (200) further comprises three seating cushion members (170), three back cushion members (180), one corner cushion member (190) and one head cushion member (195). It is understood that a wide variety of seating and/or sleeping units may be constructed using the modular cells and various cushion members described above.

The modular design system of the present invention further preferably includes a plurality of texture panels. The texture panels are adapted to be removably attached to any external surface of the modular cells to easily change the overall color and texture of the interior design system. The texture panels can come in a variety of colors and can be made with any type of suitable material, depending on a customer's preference. For example, the texture panels can comprise fabric materials, e.g. cotton, linen, wool, silk, velvet, plush, felt, canvas, etc., metal materials, e.g. aluminum, brass, bronze, chrome, copper, stainless steel, steel zinc, etc., stone materials, e.g. alabaster, granite, marble, slate, limestone, quartz, soapstone, cement, ceramic, etc., wood materials, e.g. birch, bamboo, ample, teak, chestnut, oak, ash, cherry, elm, mahogany, pine, rose, walnut, etc., glass materials and/or plastic materials.

The texture panels can also come in a variety of finishes, e.g. weaved, knitted, dyed or printed for the fabric materials, anodized, galvanized, polished, semi-polished, brushed, satin, hammered or riveted for the metal materials, polished, semi-polished, glazed, speckled or rough for the stone materials, polished, gloss, semi-gloss, satin, stained, laminated, paneled or natural for the wood materials, and tinted, mirrored or frosted for the glass materials. Additionally, the textured panels can comprise eco-friendly materials, such as recycled materials. It should be understood that the above materials are only exemplary, and that any other material and/or finish can be used without departing from the spirit and scope of the present invention.

In some embodiments, the panels have surface indicia, such as advertising or branding, printed on them. In additional embodiments, the surface of the panels may include artistic elements to further enhance the aesthetic appeal of the modular interior design system.

Figure 21A:
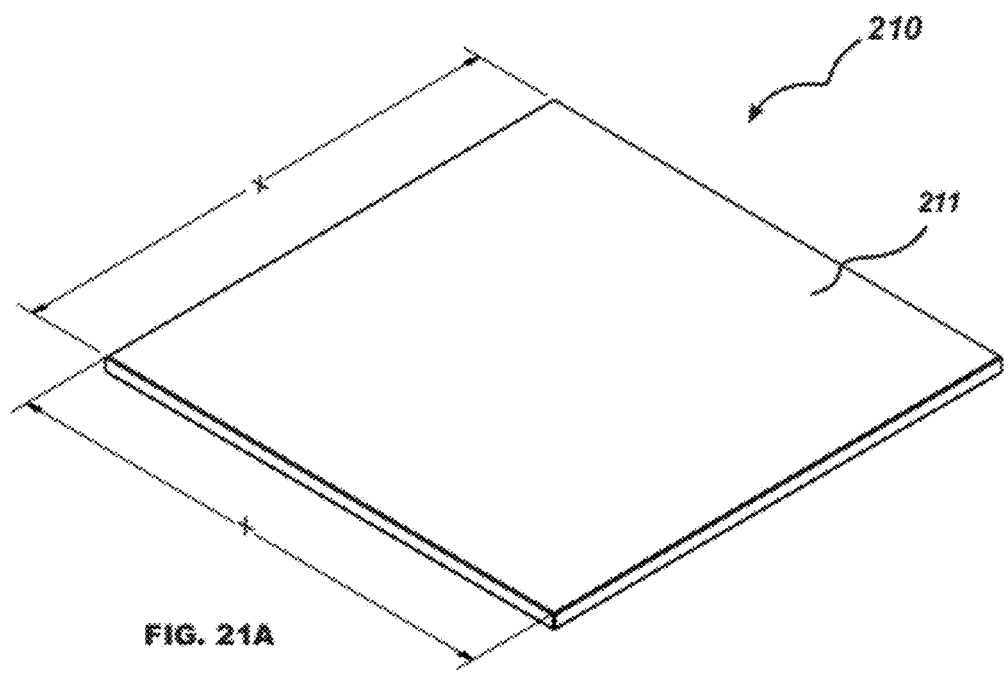
FIGS. 21A and 21B are front and rear perspective views of a hard texture panel of the modular interior design system of FIG. 1.
Figure 21B:
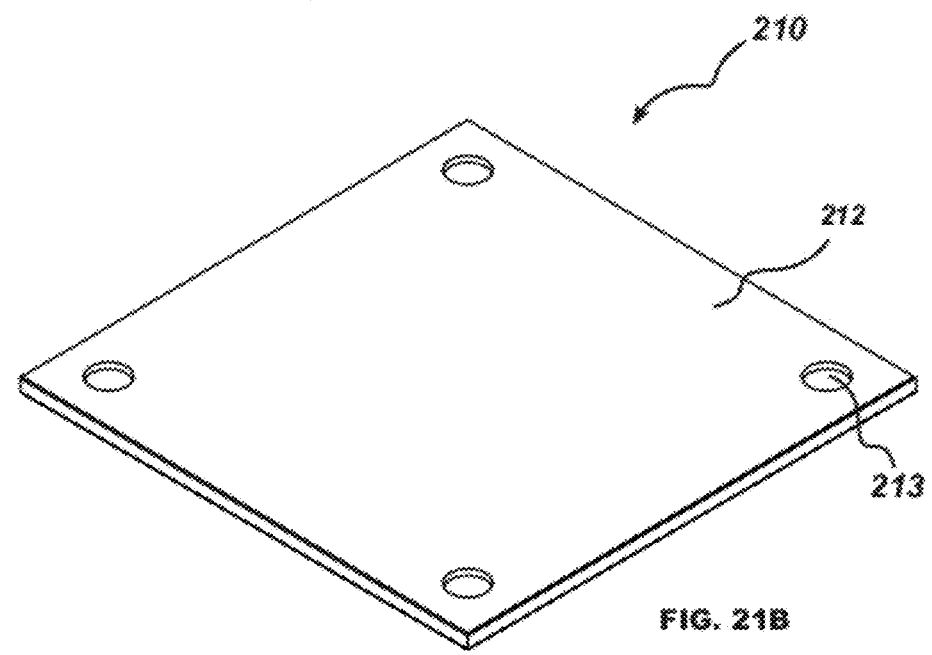

FIGS. 21A and 21B illustrate an exemplary embodiment of a texture panel (210). In this embodiment, the texture panel (210) is made with a hard type material, e.g. wood, metal or glass. The texture panel has a front surface (211) that is flat, smooth and visually appealing, and a back surface (212) that includes at least one hole (213) for removable attachment to a modular cell. A width (x) of the texture panel is substantially the same as a length (x) of the panel, such that the panel corresponds to the shape of the base modular cell (15) shown in FIGS. 4A-4B. The texture panel (210) preferably has a small thickness, such that it is light weight and is easy to handle during assembly.

Figure 22A:
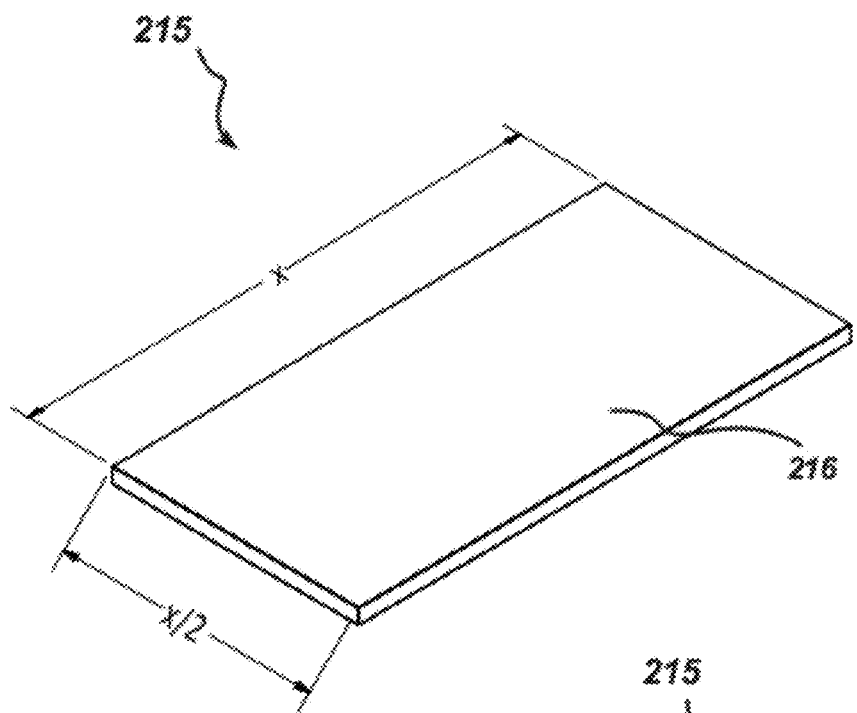
FIGS. 22A and 22B are front and rear perspective views of another configuration of the hard texture panel shown in FIGS. 21A-21B.
Figure 22B:
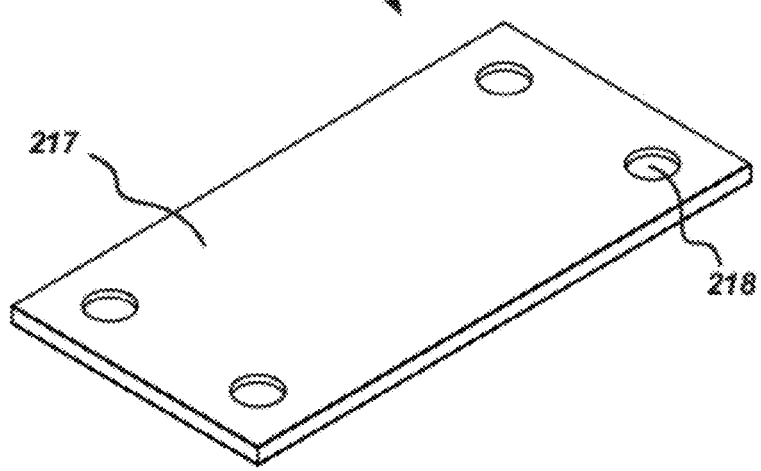

FIGS. 22A and 22B illustrate another embodiment of the texture panel. The texture panel (215) has a length (x) and a width (x/2) that is twice less than the length of the panel, such that it corresponds to the shape of the modular half cell (110) shown in FIGS. 6A-6B. The texture panel (215) also has a front surface (216) and a back surface (217) with at least one hole (218) for removable attachment to the corresponding modular cell surface.

Figure 23A:
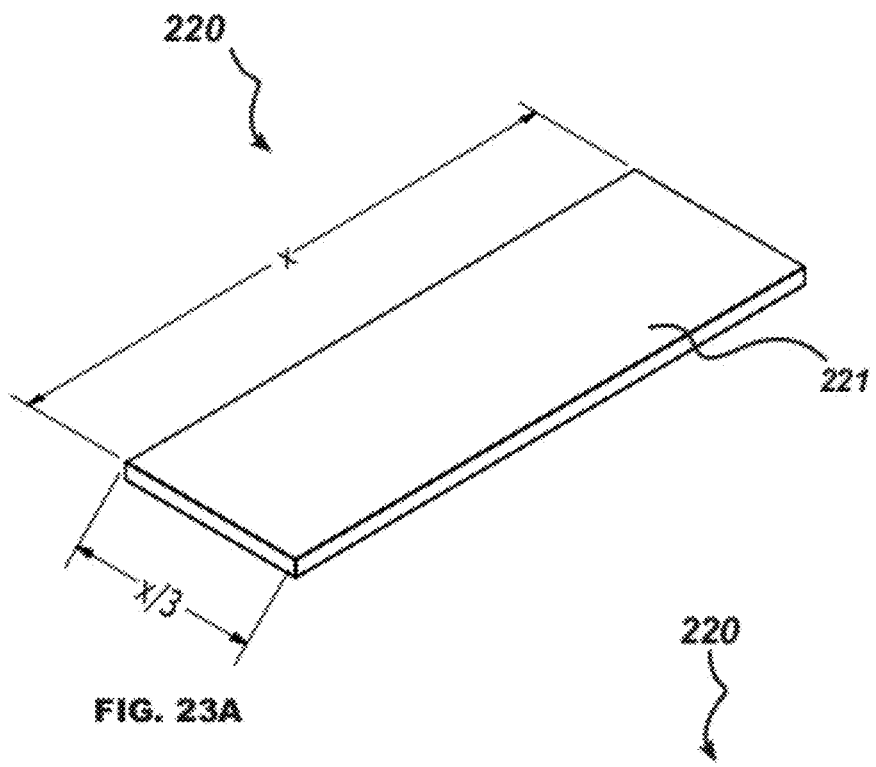
FIGS. 23A and 23B are front and rear perspective views of an additional configuration of the hard texture panel shown in FIGS. 21A-21B.
Figure 23B:
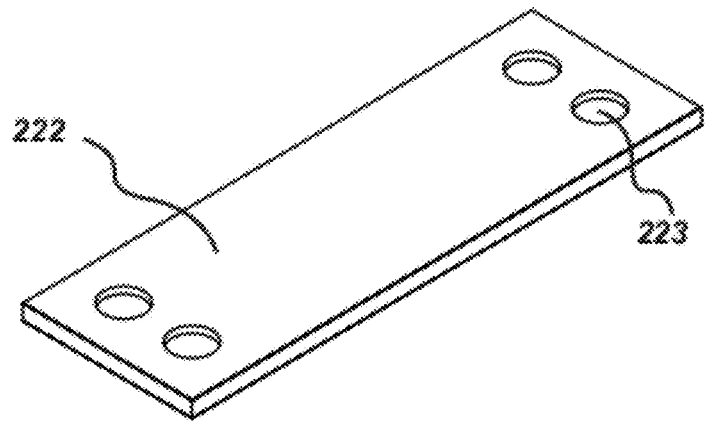

The texture panel (220) shown in FIGS. 23A-B has a length (x) and a width (x/3) that is three times less than the width, such that it can be attached to the exterior of the modular flat cell (120) shown in FIGS. 8A and 8B. Similar to the texture panels described above, the panel (220) has a front side (221) and a back side (222) with at least one hole (223) through which the panel is removably attached to the modular cell.

Figure 24A:
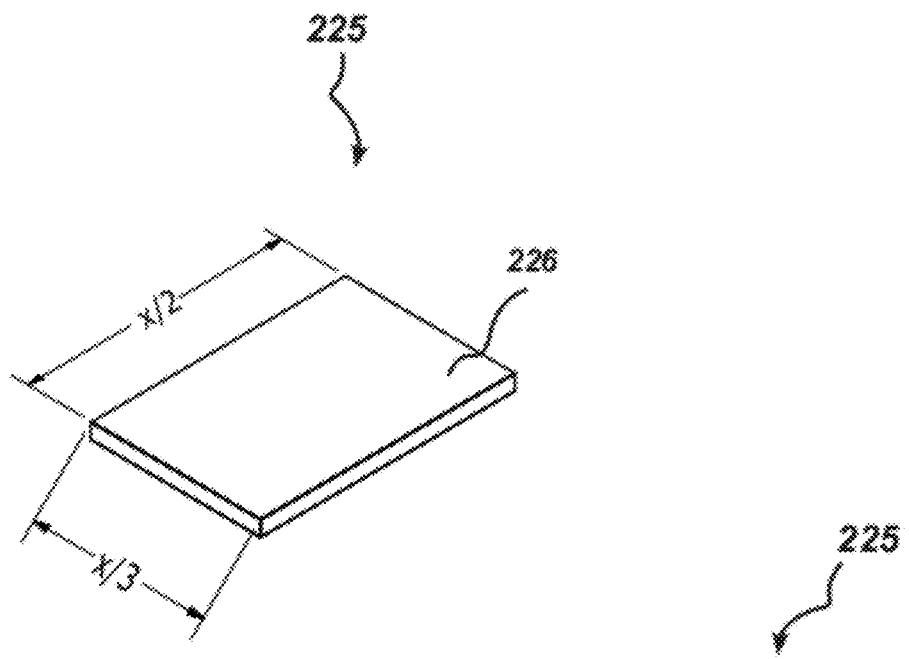
FIGS. 24A and 24B are front and rear perspective views of yet another configuration of the hard texture panel shown in FIGS. 21A-21B.
Figure 24B:
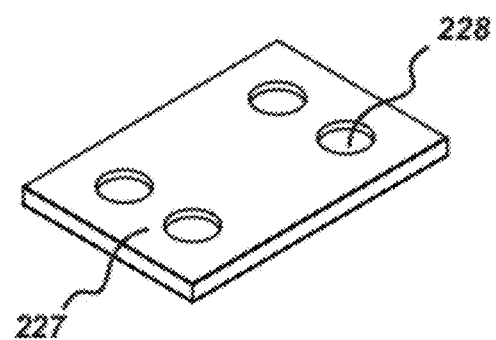

FIGS. 24A and 24B illustrate a further embodiment of the texture panel in accordance with the present invention. The texture panel (225) has a length (x/2) and a width (x/3) such that, for example, six panels (225) can be attached to the modular base cell (15) to completely cover one face of the cell. This way, the texture panels (225) having different colors may be used to further enhance the aesthetic and stylistic appeal of the modular interior design system of the present invention. The panel (225) also has a front side (226) and a back side (227) with at least one hole (228) through which the panel is removably attached to the modular cell.

FIGS. 25A-25C illustrate yet another embodiment of the texture panel. In this embodiment, the texture panel (230) is made with a soft material layer provided of the front surface (231) of the panel. The soft layer (233) can be permanently or removably attached to a back side of the panel (232), which has at least one hole (234) for attachment to the modular cell. The soft layer comprises any type of a suitable material, e.g. textile, leather or faux leather, and can further include a cushioning layer, e.g. a layer of foam. The use of the soft texture panel (230) is advantageous where it is desirable to have furniture with soft surface, such as kids' furniture.

Figure 26A:
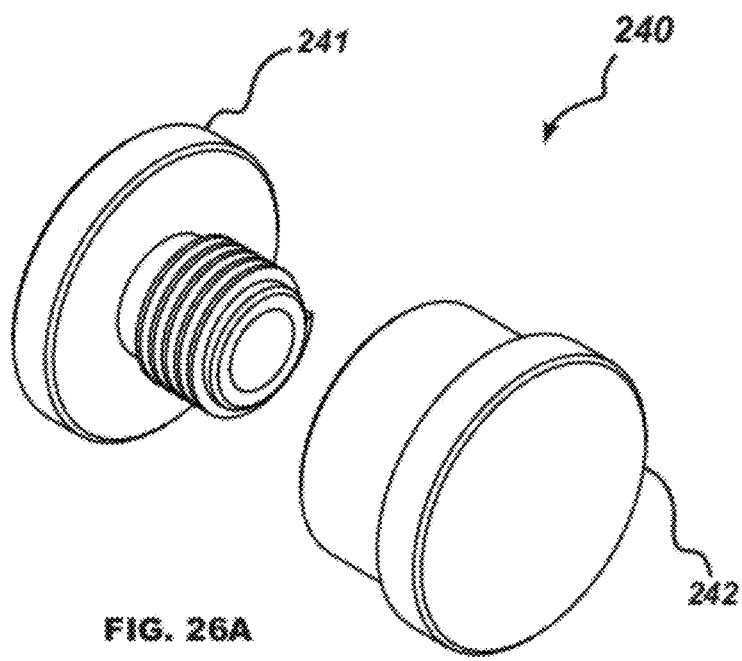
FIGS. 26A and 26B are front and rear perspective views of a connector of the modular interior design system of FIG. 1.
Figure 26B:
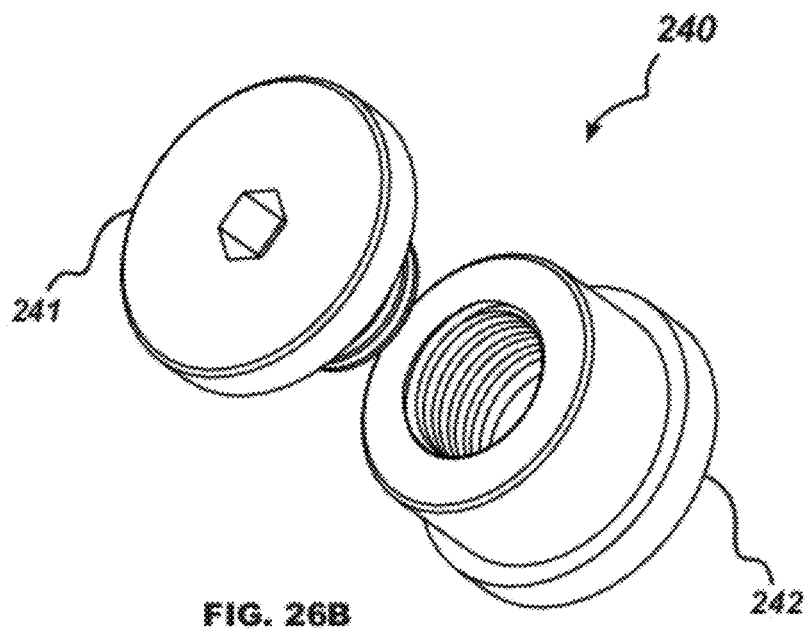
Figure 27:
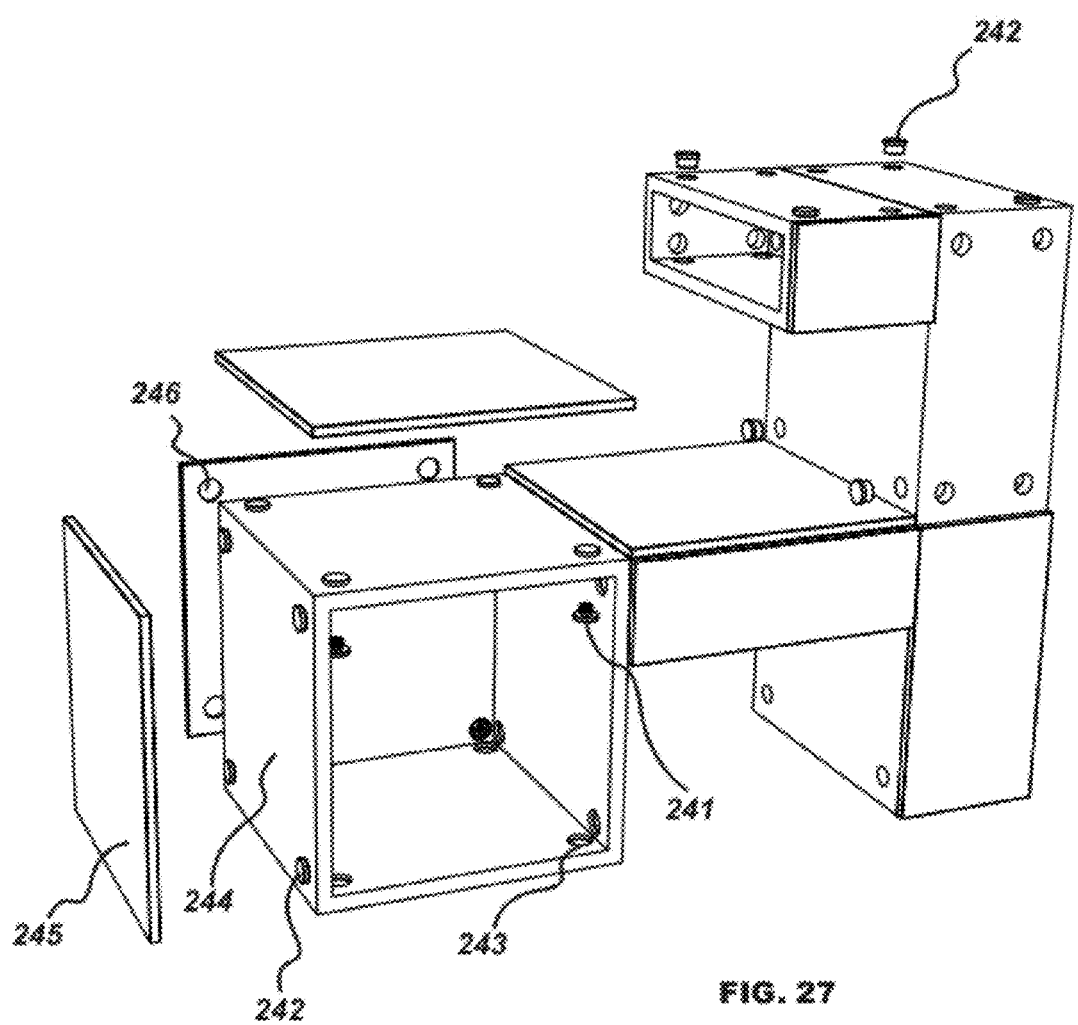
FIG. 27 is a front perspective view of the modular interior design system in the configuration of a desk unit, showing the use of texture panels and connectors.

Any suitable type of a connector is used to attach the texture panels to the corresponding modular cells in accordance with the present invention. An exemplary connector (240) is shown in FIGS. 26A-26B. The connector includes a screw member (241) with a threaded outer surface and a cap member (242) with a corresponding threaded inner surface. During the assembly, as shown in FIG. 27, the cap member (242) is first fitted into a locking hole (243) provided in a modular cell (244). Then, the screw member (241) is threaded into the cap member (242) to securely attach the connector (240) to the modular cell wall. A texture panel (245) is aligned with the modular cell wall such that the cap member (242) fits into at least one hole (246) on the back side of the panel (245) thereby securing the panel to the modular cell (244).

The cap member (242) is also used to cover any exposed locking holes in the assembled modular cells. As shown in FIG. 27, the cap member (242) is simply fitted into the locking hole (243) in the modular cell to provide a smooth, visually appealing surface. Additionally, the connector (240) can be used as a support member for the modular cells that rest directly on a floor surface. When used as such, the cap member (242) of the connector is preferably provided with a soft outer layer to prevent damage to the floor surfaces when the furniture piece is moved.

In some embodiments, the modular interior design system of the present invention also includes at least one support member, as shown in FIGS. 28A and 28B. The support member (250) is preferably an elongated rod that is hollow or solid and that is made with any suitable material that is sufficiently durable to act as the support member, such as metal or hard plastic. The support member (250) preferably has a cylindrical shape with an outside diameter slightly smaller than the inner diameter of at least one locking hole (251) provided in the modular cell (252) such that the support member (250) can be inserted through the locking hole (251) during the assembly of the modular system. As shown in FIG. 28B, any number of support members (250) can be used to assemble various pieces of the modular interior design system. The support members (250) are passed through any number of locking holes in the modular cells to provide additional structural support for the assembled modular system. The support members (250) can be mounted horizontally or vertically, depending on a particular piece of furniture being assembled, as illustrated in FIG. 28B.

Each of the support members (250) has a first end (254) and a second end (255). In the embodiment illustrated in FIGS. 28A-28B, both first and second ends of the support member (250) have a cavity with a threaded inner surface. Once the support member (250) is positioned inside the locking holes (251), a threaded screw member (253), similar to the screw member (157) shown in FIGS. 14A-14B, is threaded into the cavity such that the support member (250) is secured to the modular cell (252). It should be noted that any other suitable connector can be used to secure the support members to the modular cells without departing from the spirit of the present invention.

Figure 29A:
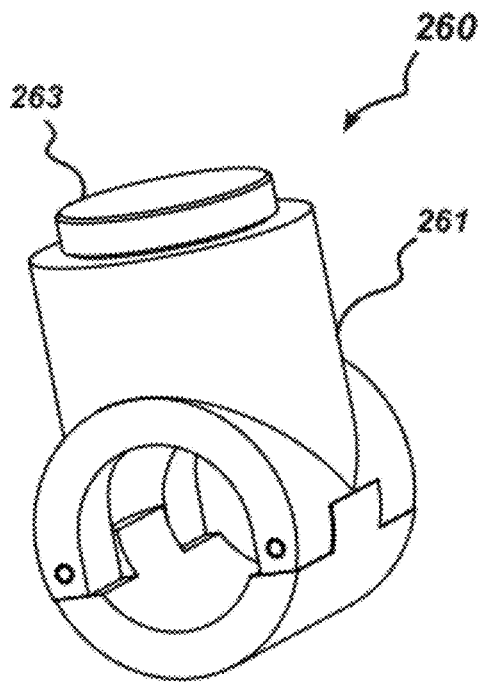
FIGS. 29A and 29B are front and side perspective views of a connector of the modular interior design system of FIG. 1.
Figure 29B:
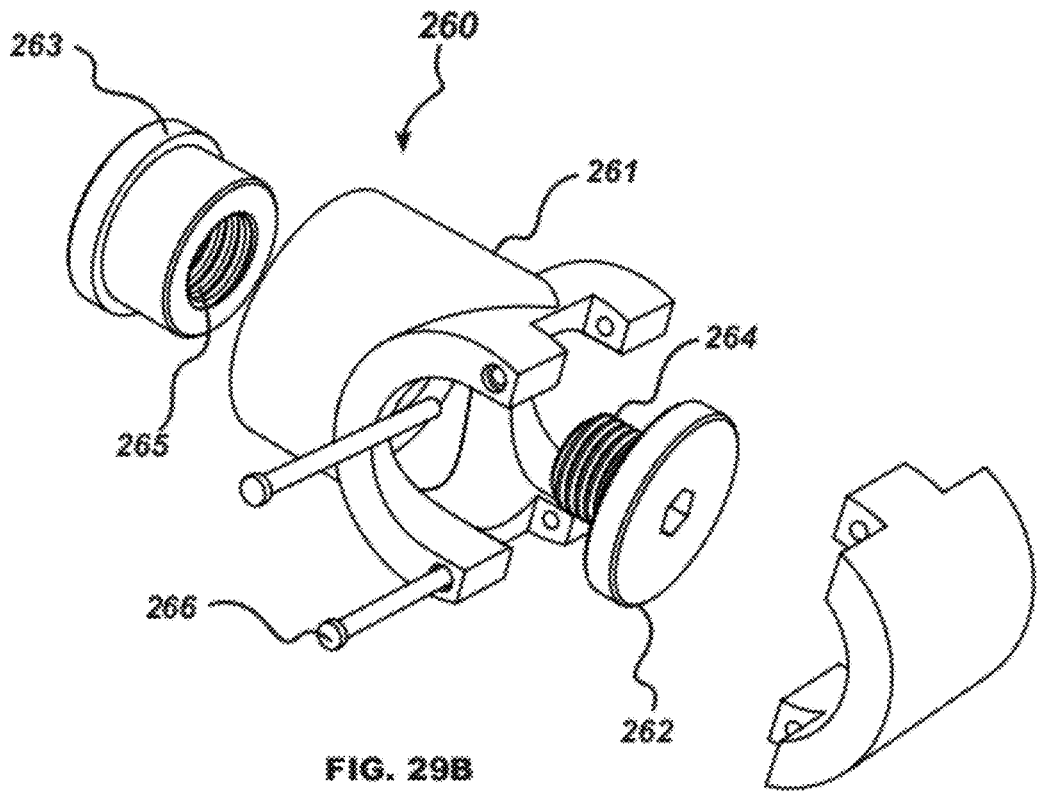

FIGS. 29A and 29B illustrate another possible embodiment of the connector for attachment of the support members to the modular cells. FIG. 29A shows the connector (260) in an assembled position and FIG. 29B shows the connector (260) in a disassembled position. The connector (260) includes a disengageable middle portion (261) designed to accommodate the support member (250) and comprising two separate pieces that are removably attached by nails or screws (266). Preferably, the middle portion (261) has an opening having a shape that substantially corresponds to the shape of the supporting member (250). The connector (260) further includes a screw member (262) and a cap member (263). The screw member (262) has a portion (264) with a threaded outer surface and the cap member (263) has a cavity (265) with a threaded inner surface. The middle portion (261) also includes another opening into which the cap member (263) and the screw member (262) are inserted to secure the connector (260) to a modular cell surface, as explained below.

Figure 30:
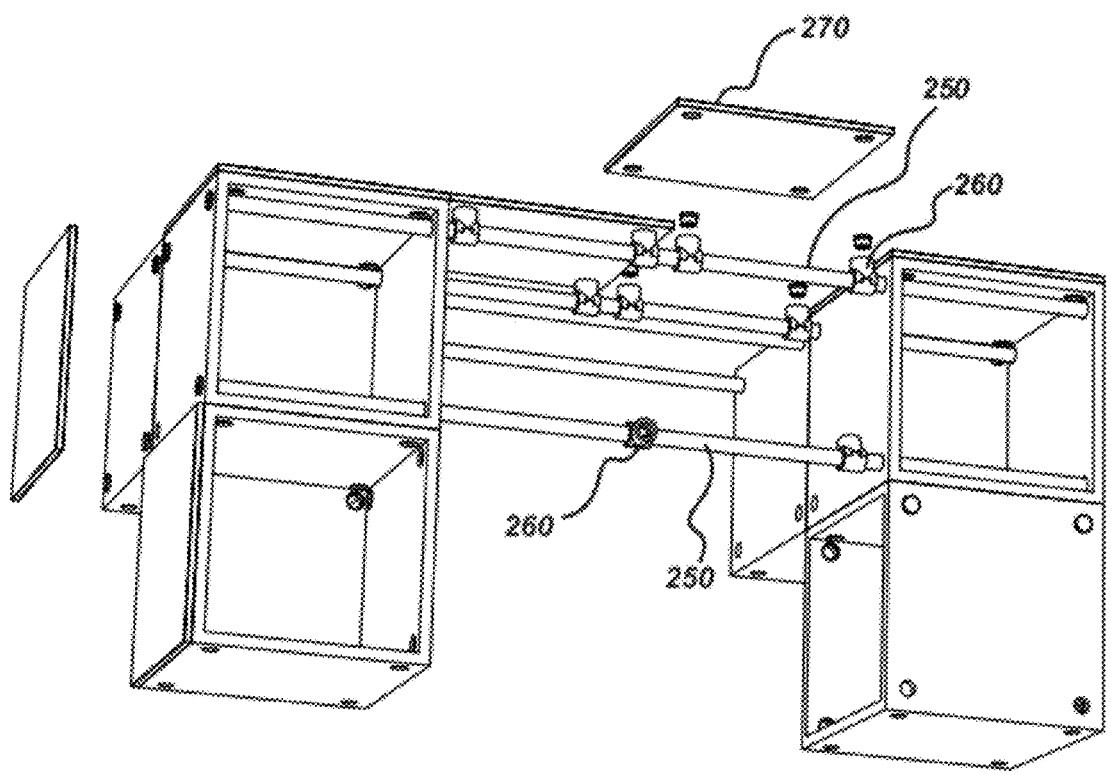
FIG. 30 is a front perspective view of the modular interior design system in the configuration of a table unit, showing the use of the connector of FIGS. 29A-29B.
Figure 31:
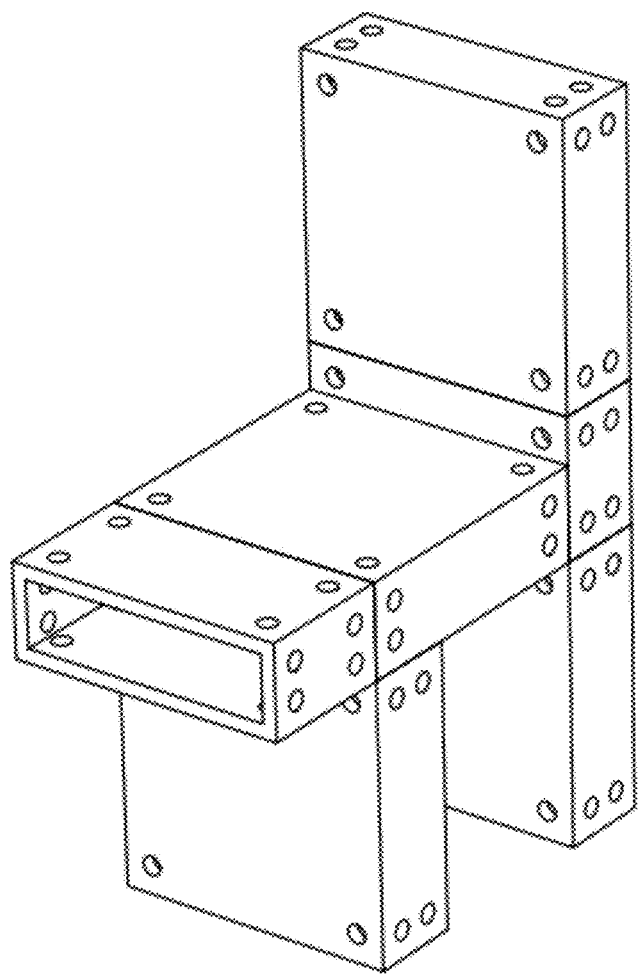
FIG. 31 is a front perspective view of the modular interior design system in the configuration of a chair.
Figure 32:
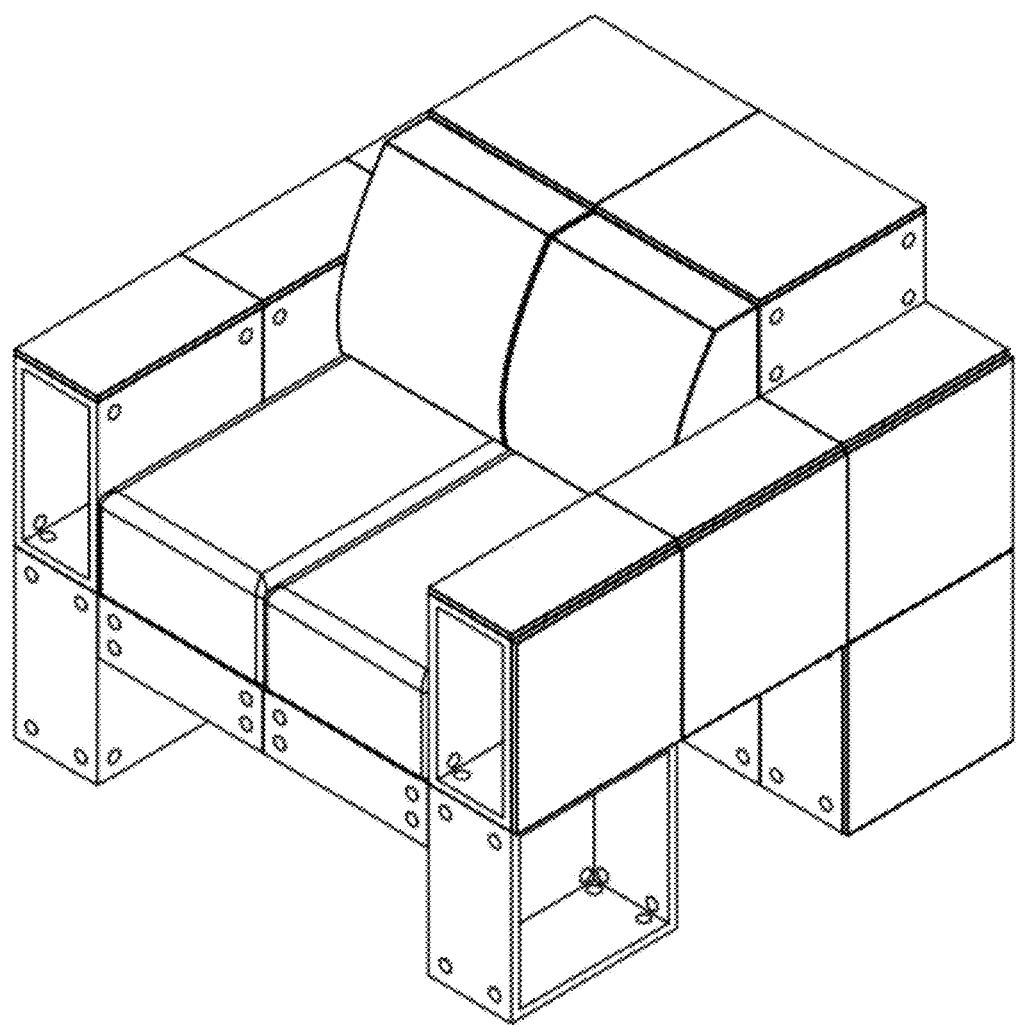
FIG. 32 is a front perspective view of the modular interior design system in the configuration of a single sofa.
Figure 33:
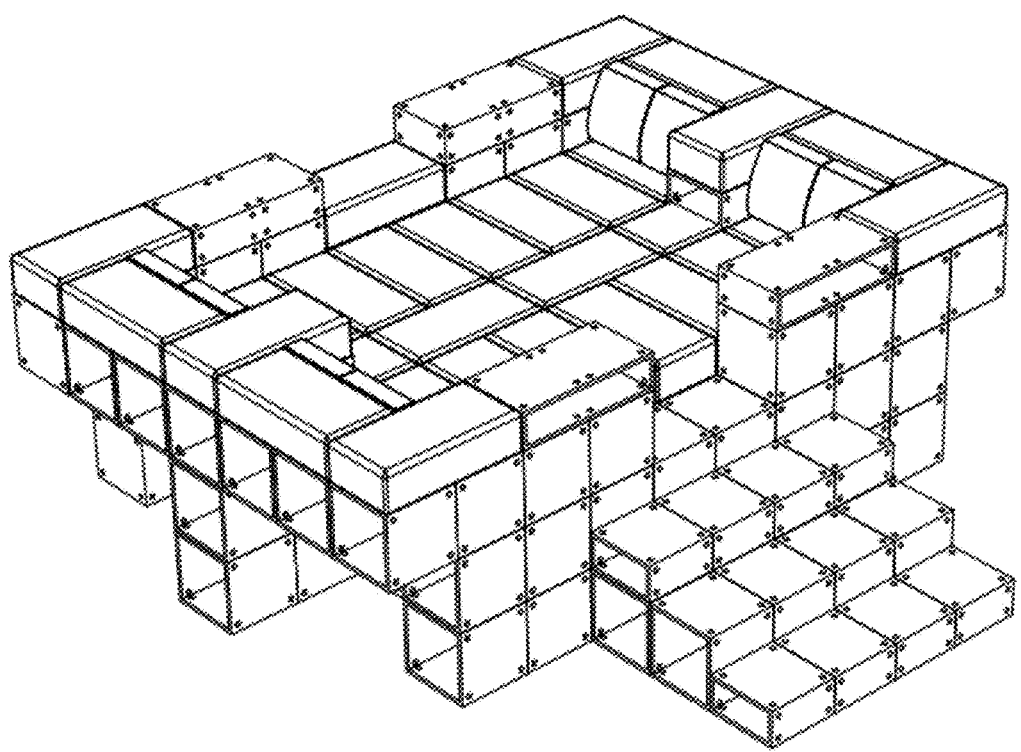
FIG. 33 is a top perspective view of the modular interior design system in the configuration of an expanded sofa.
Figure 34:
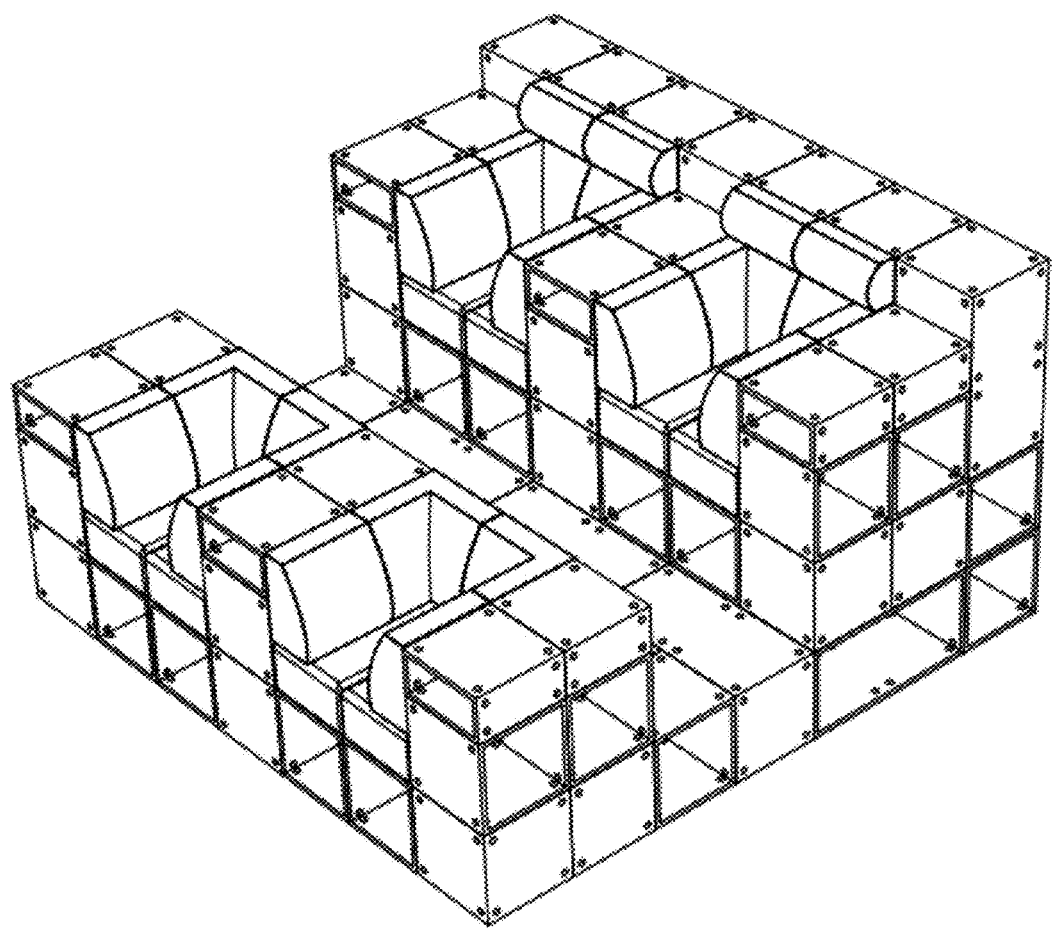
FIG. 34 is a top perspective view of the modular interior design system in the configuration of a section sofa.
Figure 35:
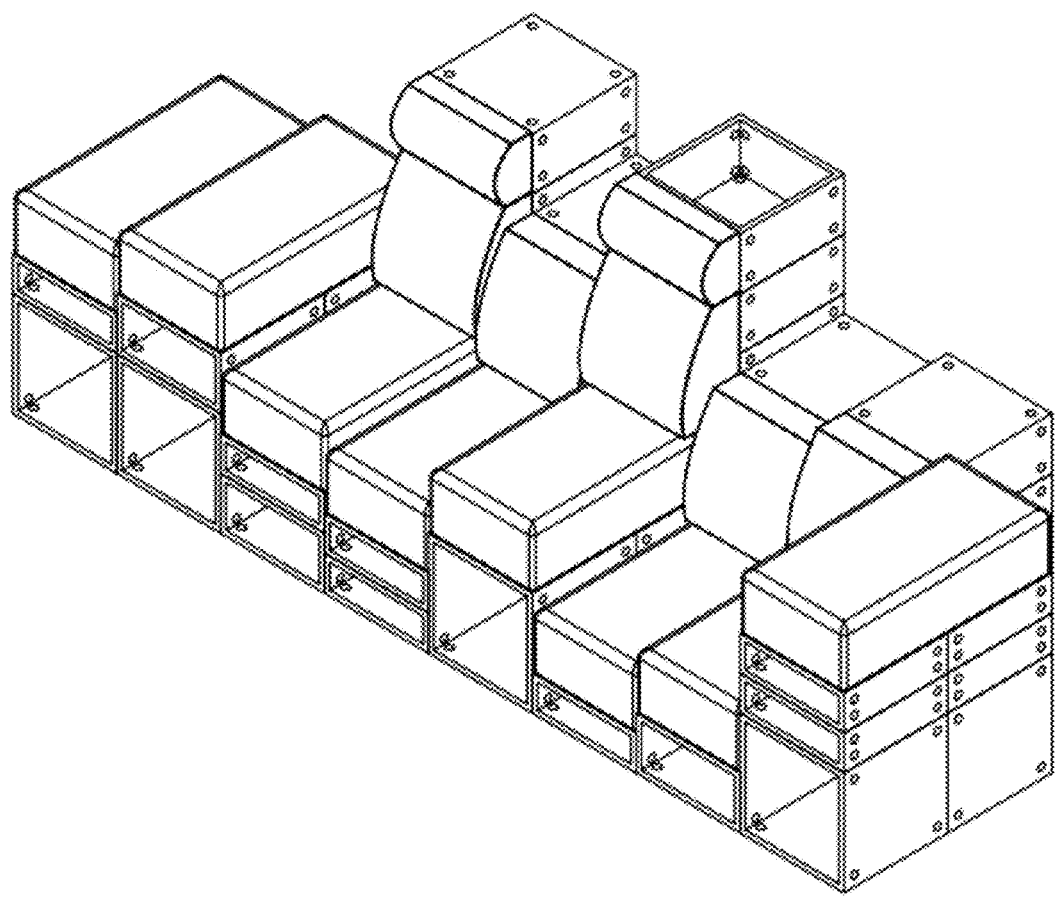
FIG. 35 is a top perspective view of the modular interior design system in the configuration of a sitting.
Figure 36:
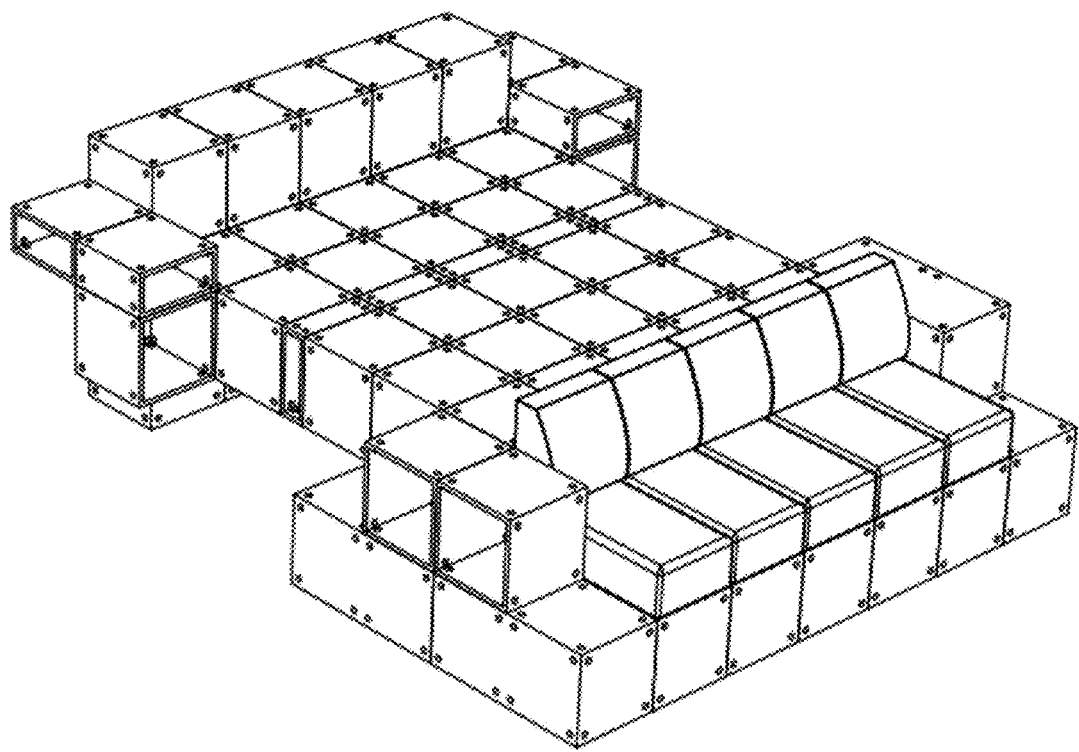
FIG. 36 is a top perspective view of the modular interior design system in the configuration of a bed with a sofa.
Figure 37:
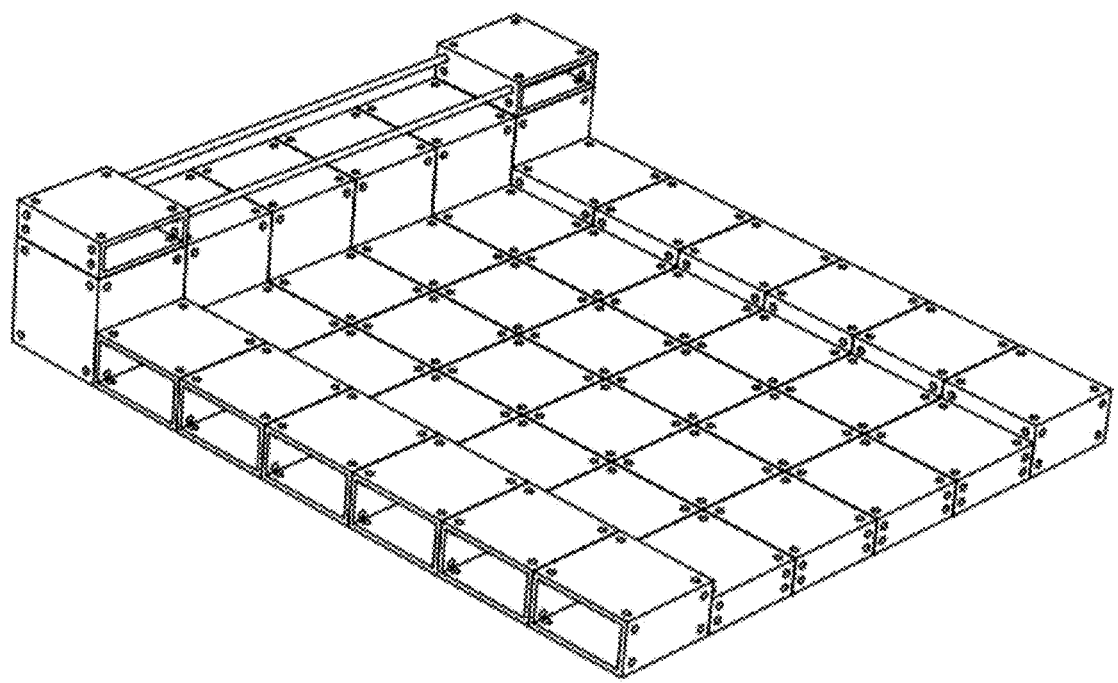
FIG. 37 is a top perspective view of the modular interior design system in the configuration of a low-rise bed.
Figure 38:
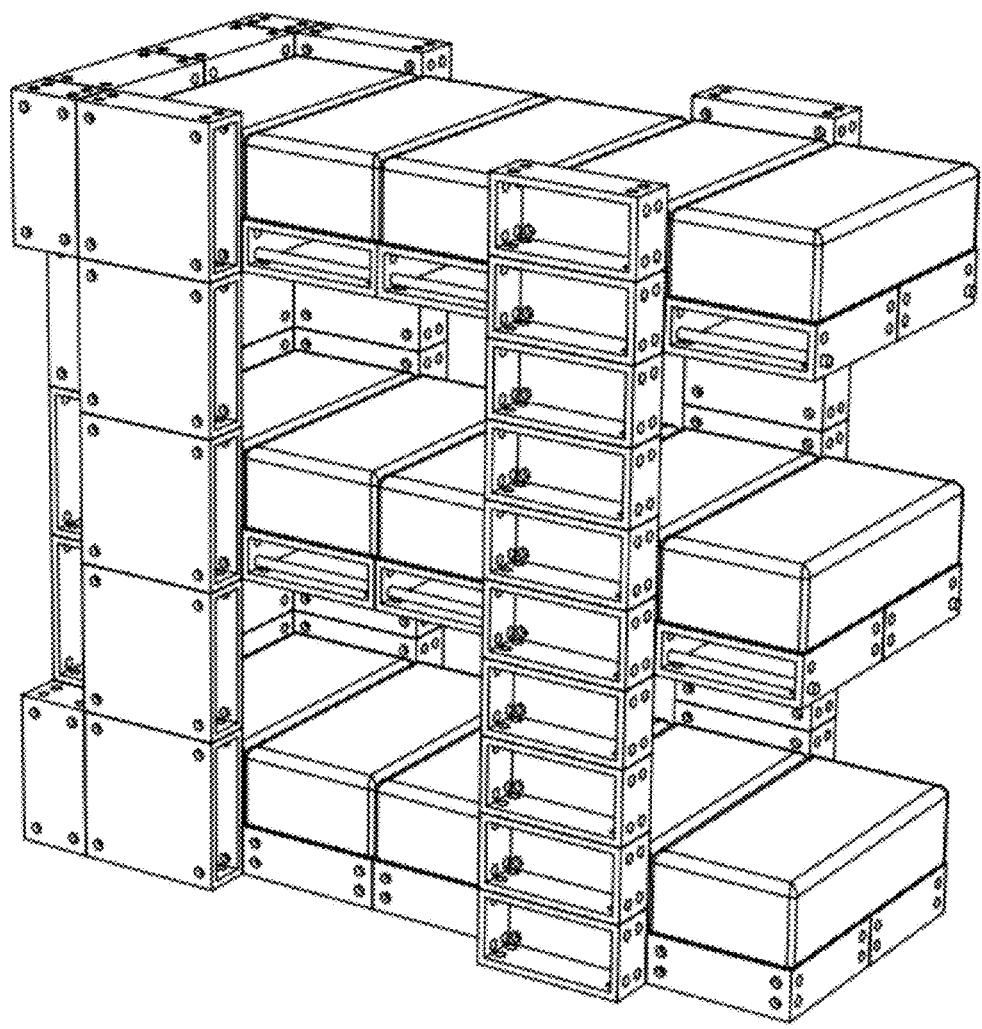
FIG. 38 is a front perspective view of the modular interior design system in the configuration of bunk beds.
Figure 39:
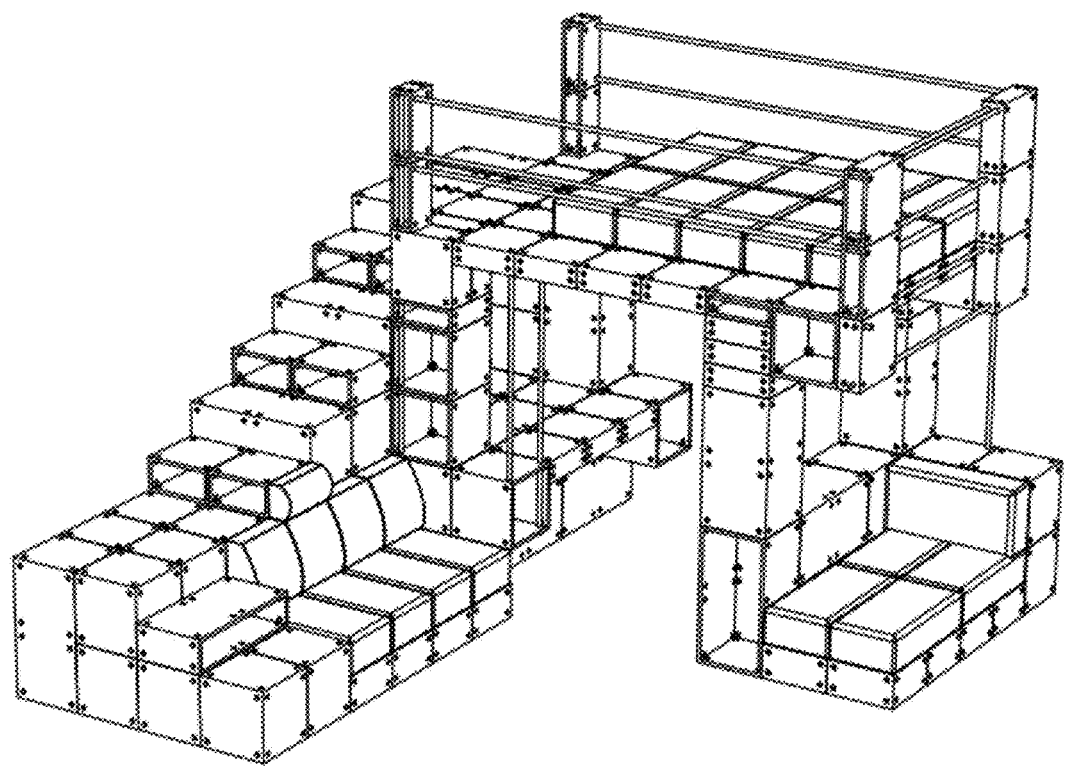
FIG. 39 is a top perspective view of the modular interior design system in the configuration of a two-level interior design, including an upper level bed area, workstation, sofa and lounge.
Figure 40:
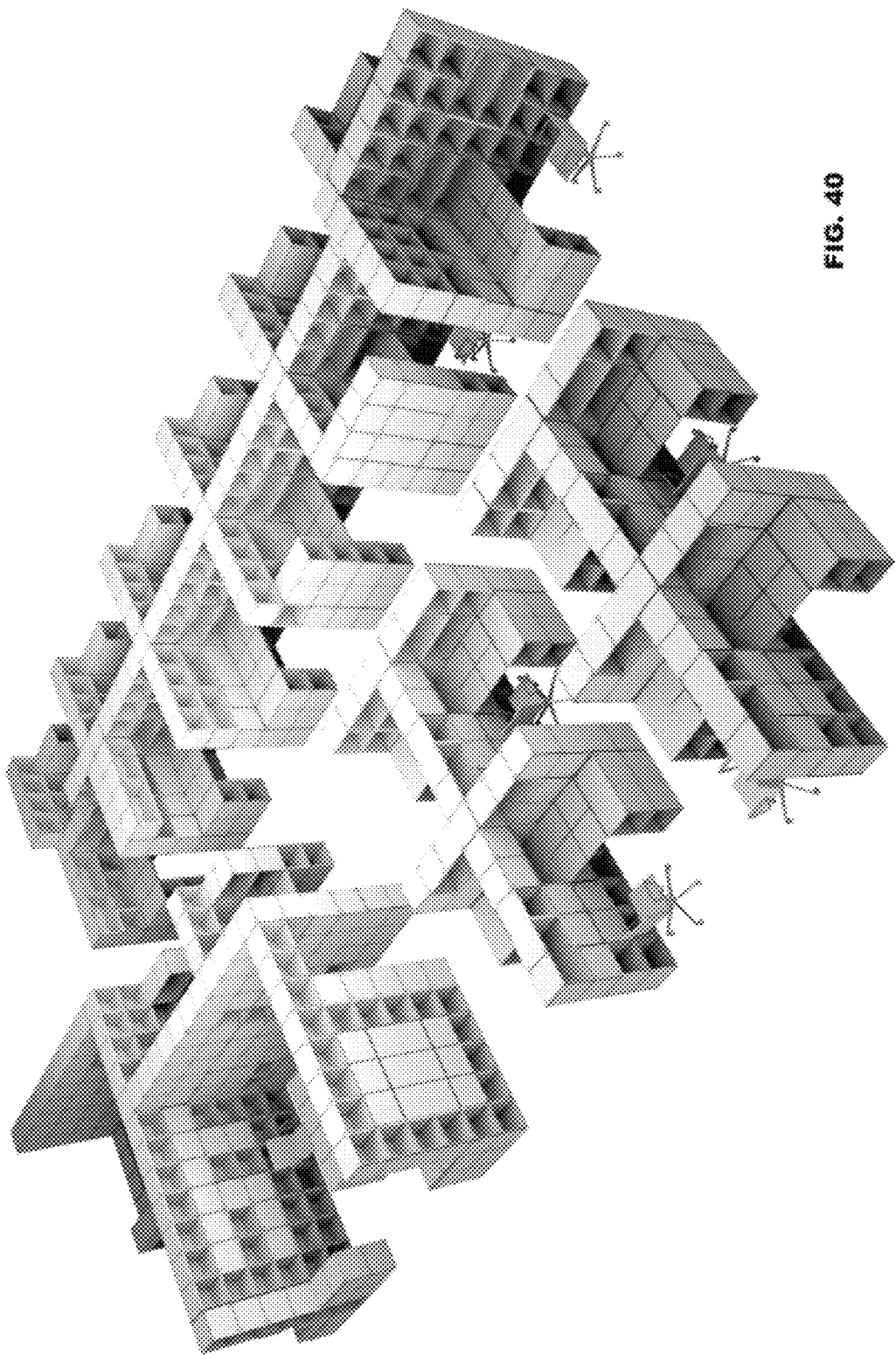
FIG. 40 is a top perspective view of the modular interior design system in the configuration of an office cubicle setup.
Figure 41:
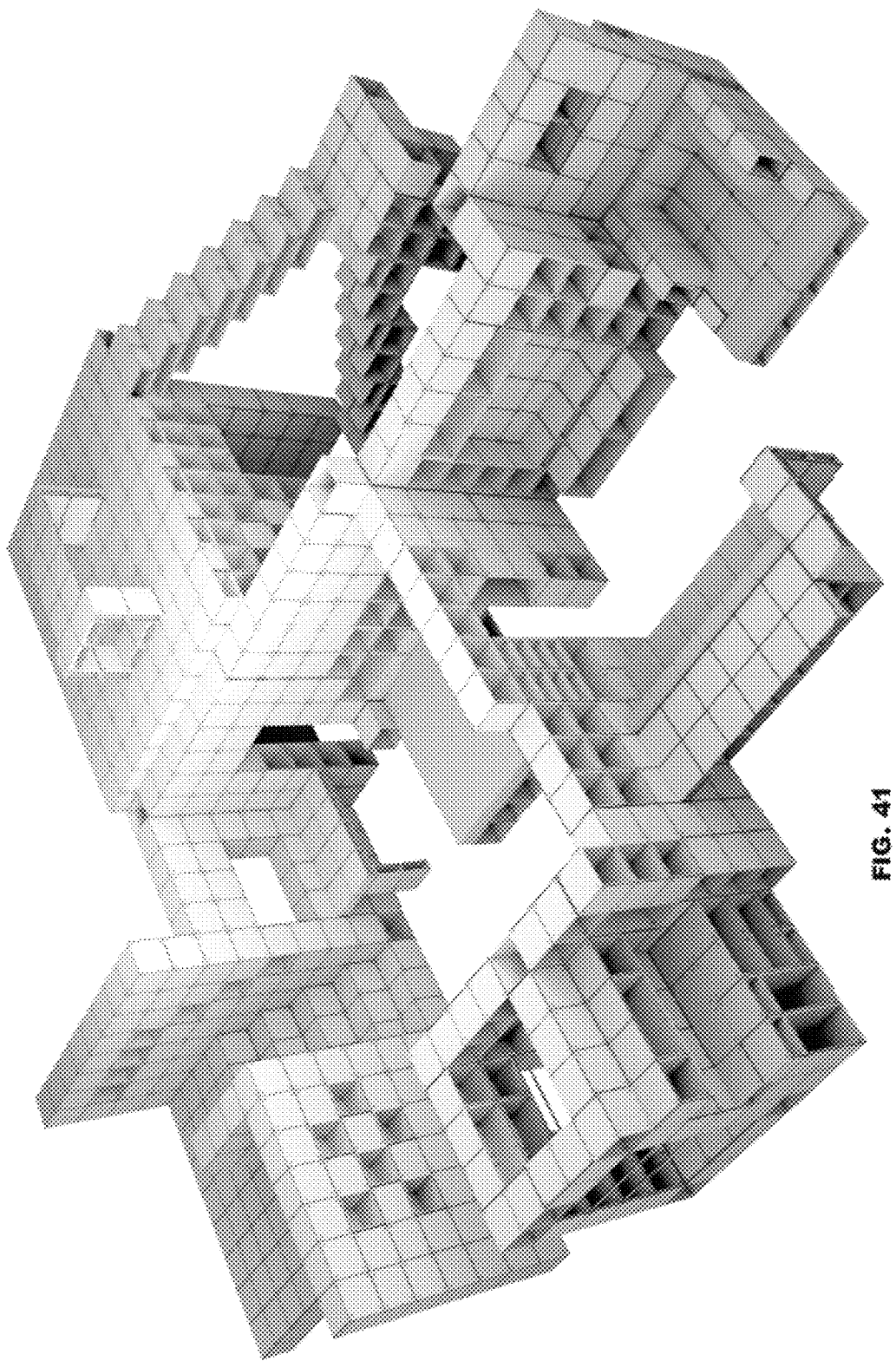
FIG. 41 is a top perspective view of the modular interior design system in the configuration of a large interior design setup.

During the assembly, the cap member (263) is first inserted into a locking hole in a modular cell to which the support member (250) is to be attached. Next, the cap member (263) is placed in the opening in the middle portion (261) of the connector (260) and the screw member (262) is coupled to the cap member (263) by engaging their respective threaded surfaces. This way, the connector (260) is secured to the modular cell surface. Then, the support member (250) is placed into the middle portion (261) of the connector (260), and the two parts of middle portion are secured by nails or screws. As shown in FIG. 30, the use of the connector (260) is particularly advantageous when the support member (250) needs to be attached to a texture panel (270).

FIGS. 31-41 illustrate various possible configurations of the modular interior design system of the present invention, such as a chair, a single sofa with texture panels, an expanded sofa, a sectional sofa, a sitting, a bed with a sofa, a low-rise bed, bunk beds, a two-level interior design including an upper level bed area, workstation, sofa and lounge, an office cubicle setup, and a large interior design setup. It is important to note that these figures illustrate only a few exemplary embodiments of the present invention, and that a countless number of combinations can be created using the modular interior design system of the present invention. For example, it is anticipated that the modular interior design system of this invention be used to construct seating, sleeping, storage and/or shelving units, room dividers, entertainment centers, end tables and coffee tables, chairs, benches, and bedroom furniture including beds, children's beds, bunk beds, as well as tables, chairs and desks used in bedrooms. It is also anticipated that the modular interior design system of this invention be used to construct dining room tables and chairs, bars, as well as game room and recreational equipment to include play tables, chairs, benches, shelving and storage cabinets. The modular interior design system of the invention is also equally well adapted for use in furnishing offices, including desks, computer and printer stands, shelving units, and telephone, copier, printer and facsimile stands. The anticipated use of the modular interior design system also includes creating shelving units, island displays, hanging racks, cash register islands, support tables, and changing rooms in commercial and/or retail establishments.

The modular interior design system of this invention is anticipated to be sold in furniture stores and other retail outlets in the form of prearranged kits. Each kit will enable a purchaser to assemble various pieces of furniture, and will come with instructions for assembling each possible furniture unit. However, it is also possible for the purchaser to exercise imagination and to assemble the modular cells in any desired shape not described in the accompanying instructions. Additionally, the consumer can purchase various texture panels and cushion member depending on the desired color, texture and style of the furniture. When the purchaser gets tired of a particular assembled furniture piece, he or she can simply rearrange the modular cell to form a new piece of furniture. Additionally, the purchaser can replace the texture panels and/or cushioning members to give the furniture piece a completely different look.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A rearrangeable furniture system comprising:
a plurality of modular units, wherein each modular unit is removably attached to another modular unit and each unit comprises four, five or six planar members;
a plurality of connectors, each connector having a cylindrical middle section and two end portions, at least one of which is detachable, all of the middle sections of all of the connectors having substantially the same diameter;
a support member having a cylindrical middle section and two end portions, at least one of which is detachable, the middle section of the support member having substantially the same diameter as the cylindrical middle sections of the connectors; and
a texture panel or a cushion member that is removably attached to one of the planar members of one of the modular units;
wherein each planar member has a tetragon shape with four sides, an interior face, an exterior face, and an edge whose width is equal to the thickness of the planar member and the edge being perpendicular to the interior and exterior faces;
wherein at least four of the planar members each have at least one side on the interior face attached to the edge of another planar member;
wherein each planar member has at least four through holes from its exterior face to its interior face, said through holes having diameters slightly larger than the diameter of the cylindrical middle sections of the connectors and the support member but small enough to prevent passage of the end portions;
wherein the support member extends through one respective though hole of the at least four through holes in each of two planar members in the same modular unit or through at least one through hole of the at least four through holes of one planar member of one modular unit and one through hole of the at least four through holes of one planar member of a non-adjacent modular;
wherein adjacent modular units are removably attached to one another by means of at least one of the at least four through holes of one planar member of each unit and where the cylindrical middle section of at least one connector is through the at least one through hole in one planar member of one modular unit and through the at least one through hole in one planar member of the adjacent modular unit;
wherein the texture panel or cushion member is removably attached to the exterior face of the planar member by means of at least one of the at least four through holes of that planar member; and
wherein the through holes on all the planar members are positioned at substantially equal distances from an adjacent corner of the planar member.

2. The furniture system of claim 1 comprising a sofa, bed, chair, shelving, table, bar, cubicle, or desk.

3. The furniture system of claim 1 comprising a sleeping unit or seating unit.

4. The furniture system of claim 1, wherein the planar members have different dimensions and the modular units have different dimensions.

5. The furniture system of claim 4, wherein the planar members are independently selected from the group consisting of:
- a planar member having a width substantially equal to its length;
- a planar member having a width about one half of its length;
- a planar member having a width about one third of its length;
- a planar member having a width about one fourth of its length; and
- a planar member having a width about one sixth of its length.

6. The furniture system of claim 4, wherein each modular unit comprises one or two first planar members having a width substantially equal to its length, and the remaining planar members independently selected from the group consisting of:
- a planar member having a width of one half of the width of the first planar member and a length equal to the length of the first planar member;
- a planar member having a width of one third of the width of the first planar member and a length equal to the length of the first planar member;
- a planar member having a width equal to the width of the first planar member and a length equal to two lengths of the first planar member;
- a planar member having a width of one half of the width of the first planar member and a length equal to two lengths of the first planar member; and
- a planar member having a width of one third of the width of the first planar member and a length equal to two lengths of the first planar member.

7. The furniture system of claim 1, wherein each of the modular units have a width-depth-height ratio of 6:6:6, 6:6:3, 6:6:2, 6:3:3, 6:3:2, 6:2:3, 6:2:6, 6:3:6, 12:6:2, 12:6:3, 12:6:6, or 6:12:6.

8. The furniture system of claim 1, wherein said at least one side on the interior face of the planar members are attached to the edge of another planar member by means of fasteners that extends through the thickness of said planar members and into the edge of the other planar member.

9. The furniture system of claim 8, wherein said fasteners are screws or nails.

10. The furniture system of claim 9, wherein said fasteners are screws that extends through the thickness of the planar member into holes in the edge of the other planar member.

11. The furniture system of claim 1, wherein each of said planar members is a flat panel.

12. The furniture system of claim 1 comprising the texture panel removably attached to the exterior face of at least one of said planar members.

13. The furniture system of claim 1 further comprising the cushion member removably attached to the exterior face of at least one of said planar members.

14. The furniture system of claim 1, wherein the modular unit has five planar members.

15. The furniture system of claim 1, wherein the cylindrical middle section of the connectors comprises a threaded channel and each end portion comprises a threaded member; and the threaded channel of said cylindrical middle section receives the threaded members of said end portions.

16. The furniture system of claim 1 further comprising at least one securing member, the securing member being attachable to the support member and capable of securing the support member.

17. The furniture system of claim 1, wherein the support member extends through at least one through hole of the at least four through holes of one planar member of one modular unit and one through hole of the at least four through holes of one planar member of a non-adjacent modular.

* * * * *